US012663434B2

(12) United States Patent
Genta et al.

(10) Patent No.: US 12,663,434 B2
(45) Date of Patent: Jun. 23, 2026

(54) AUTOMATED TANK SAMPLER SYSTEM

(71) Applicant: SAUDI ARABIAN OIL COMPANY, Dhahran (SA)

(72) Inventors: Pablo Daniel Genta, Al Khobar (SA); Abdullah G. Aldahlan, AlJubial (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 544 days.

(21) Appl. No.: 18/189,929

(22) Filed: Mar. 24, 2023

(65) Prior Publication Data

US 2024/0319223 A1 Sep. 26, 2024

(51) Int. Cl.
| | |
|---|---|
| *G01N 35/10* | (2006.01) |
| *G01N 1/20* | (2006.01) |
| *G01N 35/00* | (2006.01) |

(52) U.S. Cl.
CPC ....... *G01N 35/1067* (2013.01); *G01N 1/2035* (2013.01); *G01N 35/00871* (2013.01); *G01N 2001/205* (2013.01); *G01N 2035/00306* (2013.01)

(58) Field of Classification Search
CPC .................................................. G01N 35/1067
USPC .............. 73/863.23, 863.56, 864.63, 864.64
See application file for complete search history.

(56) References Cited

U.S. PATENT DOCUMENTS

| | | | | |
|---|---|---|---|---|
| 3,024,660 | A | * | 3/1962 | Tothill .................. G01N 1/2035 |
| | | | | 73/863.83 |
| 5,408,890 | A | | 4/1995 | Klaus |

| | | | | |
|---|---|---|---|---|
| 6,862,943 | B2 | * | 3/2005 | Tibbets .................... G01N 1/08 |
| | | | | 73/864.64 |

(Continued)

FOREIGN PATENT DOCUMENTS

| | | |
|---|---|---|
| CN | 207751733 U | 8/2018 |
| CN | 111537283 A | 8/2020 |

(Continued)

OTHER PUBLICATIONS

"UKSGL Fuel Sampler/Thief, Bottom (BTMS)", Mar. 23, 2023; pp. 1-7; Retrieved from the Internet: https://www.oilybits.com/fuel-sampler/thief-bottoms-btms.html (7 pages).

"Mobile Sampler GT4", Mar. 23, 2023; pp. 1-4; Retrieved from the Internet: URL: https://www.nauticexpo.com/prod/enraf-marine-systems/product-30973-368666.html (4 pages).

(Continued)

*Primary Examiner* — Daniel S Larkin
(74) *Attorney, Agent, or Firm* — Osha Bergman Watanabe & Burton LLP

(57) ABSTRACT

A sample system for a fluid tank with an opening includes: a head unit, a sample vessel, a transport mechanism, and a controller. The head unit has a hollow body with a head connection that connects to the opening. The sample vessel includes a first sample chamber with a first sample valve disposed in a vessel body that fits within the hollow body. A first sample valve of the sample mechanism actuates to provide fluid communication to the first sample chamber. The transport mechanism connects to the head unit and the sample vessel, and moves the sample vessel between a home position and a first position. In the home position, the sample vessel is positioned within the hollow body. In the first position the sample vessel is lowered to a first level in the fluid tank, at which point the controller actuates the first sample valve.

20 Claims, 9 Drawing Sheets

(56) References Cited

U.S. PATENT DOCUMENTS

| | | | | |
|---|---|---|---|---|
| 6,865,933 | B1 * | 3/2005 | Einarson | E21B 49/081 |
| | | | | 73/864.33 |
| 8,770,048 | B2 * | 7/2014 | Khuzwayo | G01N 1/16 |
| | | | | 73/864.51 |
| 2013/0167666 | A1 * | 7/2013 | Jenkins | G01N 1/02 |
| | | | | 73/863.23 |

FOREIGN PATENT DOCUMENTS

| | | |
|---|---|---|
| CN | 211179143 U | 8/2020 |
| CN | 111879572 A | 11/2020 |
| CN | 212483033 U | 2/2021 |
| CN | 112985897 A | 6/2021 |
| CN | 215339084 U | 12/2021 |
| DE | 4338821 C1 | 4/1995 |
| FR | 1078546 A | 11/1954 |
| RU | 2321837 C1 | 4/2008 |

OTHER PUBLICATIONS

"Enraf Tanksystem—Gauging and Sampling Equipment", Mar. 23, 2023; pp. 1-11; Retrieved from the Internet: URL: https://www.ship-technology.com/contractors/tanks/tank/ (11 pages).

"UKSGL Fuel Sampler/Thief, Spot/Any Level (ALS)", Mar. 23, 2023; pp. 1-7; Retrieved from the Internet: URL: https://www.oilybits.com/fuel-sampler/thief-spot/any-level-als.html (7 pages).

"Sampling Device NK-SD50", Mar. 23, 2023; pp. 1-3; Retrieved from the Internet: URL: http://www.corpwin.com/sampling-device (3 pages).

"Portable Gauging & Sampling Solutions—Product Overview for Land-Based Applications", Honeywell Marine; Oct. 2009; pp. 1-24 (24 pages).

International Search Report and Written Opinion issued in Application No. PCT/US2024/020696, mailed on Jun. 24, 2024 (13 pages).

* cited by examiner

AUTOMATED TANK SAMPLER SYSTEM

BACKGROUND

In the petroleum industry, it is common for well sites and manufacturing facilities to possess on-site storage of hydrocarbon fuels that are used to power generators, tools, vehicles, and other facility equipment. The hydrocarbon fuels are commonly stored for long periods of time in large-volume fluid tanks. The stored fluids are periodically sampled and analyzed in a laboratory to monitor the quality thereof for the presence of contaminants, such as water, solids, or other liquid substances.

For collection purposes, the samples are taken at various levels within the tank to ensure that any contaminant substances of heavier and lighter density than the stored fuel can be detected by lab analysis. In tandem, it is beneficial to record logistics of the sampling process, including the sampling time and the sampling depth within the fluid tank. Furthermore, as the hydrocarbon fuels are combustible, any equipment used while sampling will be exposed to an explosive environment, and should be designed according to the possibility of an explosion occurring.

SUMMARY

A sample system for a fluid tank with an opening includes a head unit, a sample vessel, a transport mechanism, and a controller. The head unit includes a hollow body, and an end of the hollow body includes a head connection that removably connects to the opening of the fluid tank. The sample vessel includes a vessel body sized to fit within the hollow body, and a first sample chamber disposed within the vessel body. A first sample valve selectively actuates to provide fluid communication to the first sample chamber. The transport mechanism is connected to the head unit and the sample vessel, and selectively moves the sample vessel between a home position and a first position. In the home position, the sample vessel is within the hollow body, and in the first position the sample vessel is lowered to a first level in the fluid tank. When the sample vessel is in the first position, the controller actuates the first sample valve.

A method for sampling fluid in a fluid tank includes connecting a head unit to the fluid tank. The head unit includes a hollow body with an end that includes a head connection adapted to removably connect to the opening of the fluid tank. The method further includes conveying, using a transport mechanism connecting the head unit to a sample vessel, the sample vessel from a home position to a first position. In the home position, the sample vessel is disposed within the hollow body, and in a first position where the sample vessel is lowered to a first level in the fluid tank. In addition, the method includes actuating, using a controller, a first sample valve that selectively provides fluid communication to a first sample chamber of the sample vessel when the sample vessel is in the first position. The sample vessel is a vessel body sized to fit within the hollow body, and the first sample chamber is disposed within the vessel body.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
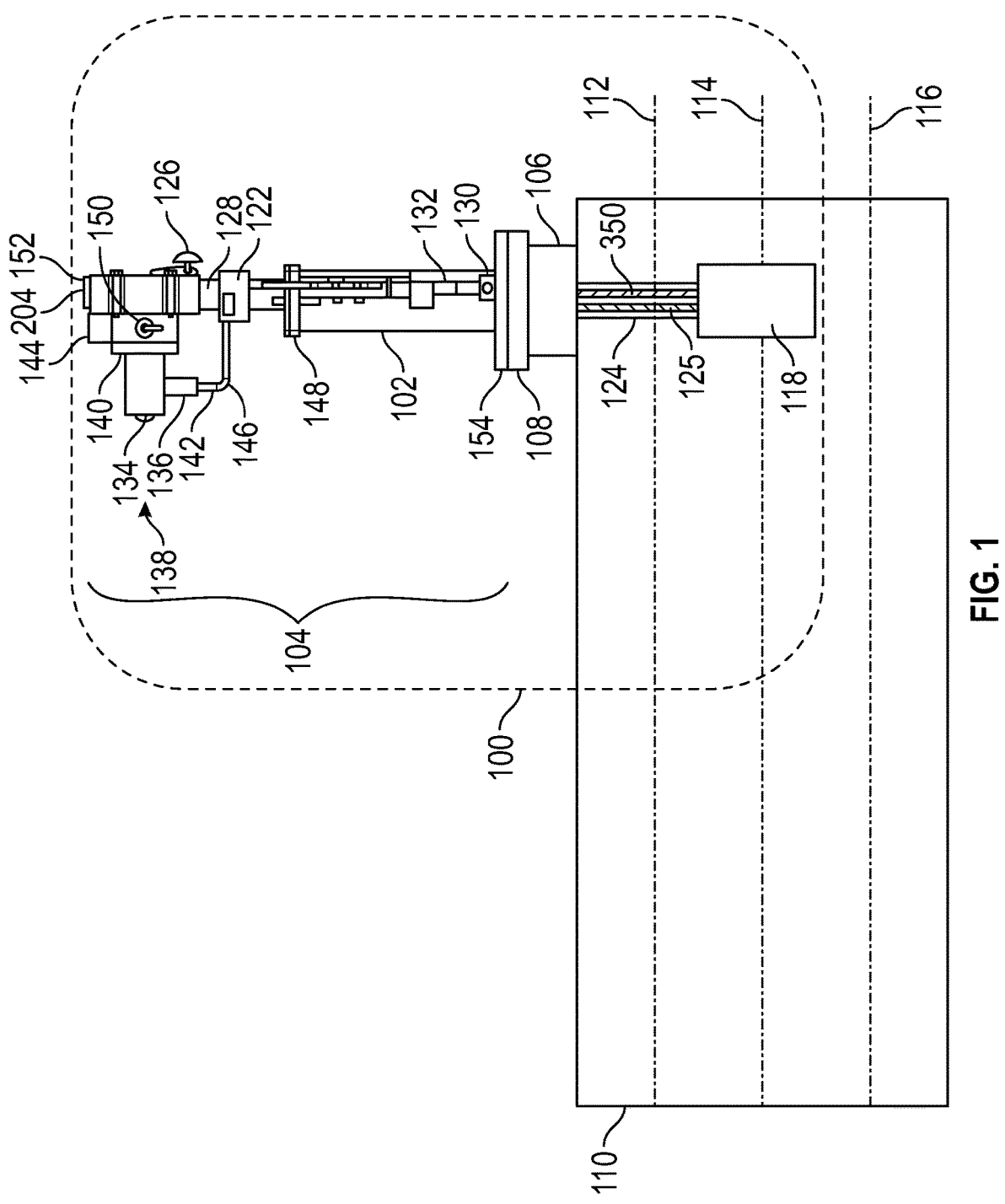
FIG. 1 depicts a tank sample system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure is practiced without these specific details. In other instances, well-known features have not been described in detail to avoid unnecessarily complicating the description.

Throughout the application, ordinal numbers, e.g., first, second, third, etc. is used as an adjective for an element i.e., any noun in the application. The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" are used to describe the position of an element. In this respect, the term "upper" denotes an element disposed physically above a corresponding "lower" element, while the term "lower" conversely describes an element disposed physically below a corresponding "upper" element in relation to the tank sample system. Likewise, the term "axial" refers to an orientation substantially parallel to a primary axis of extension of an element, while the term "radial" refers to an orientation orthogonal the primary axis of extension.

While embodiments disclosed herein are described with respect to a limited number of embodiments, those skilled in the art, having benefit of this disclosure, will appreciate that other embodiments may be devised which do not depart from the spirit of the invention as disclosed herein. Accordingly, the scope of the invention should be limited only by the attached claims.

In general, embodiments of the invention are directed towards sampling systems of hydrocarbons as well as sampling systems for large volume storage tanks. Embodiments of the invention are further related to sampling methods used to collect samples at different heights within the storage tank. In order to facilitate sample collection, this disclosure presents devices that, in accordance with some embodiments, automatically, manually, or semi-manually place a sample collection canister at a desired level, open sample collection valves of the sample collection canister, and retrieve the sample. The collection process may, in some embodiments, be completed with a canister that includes a controller and a multistage diaphragm electrohydraulic level switch that control sampling valve actuators and sample collection valves. The sampling valve actuators and sample collection valves can be manually operated, or opened and closed at pre-programmed levels within the fluid tank.

FIG. 1 depicts a tank sample system 100 in accordance with one or more embodiments. The tank sample system 100 is used to collect fluid samples from a fluid tank 110, which is a steel, aluminum, fiberglass, or equivalent container capable of storing flammable liquids and explosive fuels. Such fluid tanks are commonly referred to in the art as Underground Storage Tanks (UST), and vary in size and complexity according to the amount and type of stored fuel. Although being depicted as a single wall UST in FIG. 1, a fluid tank 110 may alternatively be embodied as a double wall UST without departing from the nature of this specification. Further, although a UST is described, the fuel tank 110 could be any kind of tank including, e.g., an aboveground tank, a fuel tank on a vehicle or vessel, etc.

As described above, USTs store hydrocarbon fuels, which are inherently explosive. Thus, at its uppermost surface, the fluid tank 110 includes an opening in the form of a main isolation valve 106, which may be a gate valve, ball valve, plug valve, or equivalent valve that can be opened or closed to allow access to the fluid tank 110. The main isolation valve 106 also prevents the stored fuel from unintentionally leaking from the fluid tank 110 into the surrounding environment. The main isolation valve 106 in the illustrated embodiment includes an upper flange 108, which is a projecting rim of the main isolation valve 106 that components may be fixed to in order to interface with the fluid tank 110.

To gather samples of the fuel, a tank sample system 100 includes a sample vessel 118, which is further described below, and a head unit 104 that actuates the sample vessel 118. A lower flange 154 of a head unit 104 disposed at a peripheral end of an open ended hollow body 102 forms a head connection that is bolted or otherwise removably connected to the upper flange 108 of the main isolation valve 106. This connection allows the head unit 104 to be in fluid communication with the fluid tank 110 once the main isolation valve 106 is opened. The head unit 104 may alternatively be attached to the fluid tank 110 with removable connection means, such as bolts and nuts, a latch or clamp (or series thereof), or rigidly fixed to the fluid tank 110 by brazing or welding, for example.

As shown in FIG. 1, the head unit 104 is formed of a plurality of components that generally operate to selectively convey a sample vessel 118 within the fluid tank 110. As the sample vessel 118 is lowered in the fluid tank 110, valves (e.g., FIG. 3) of the sample vessel 118 are opened and fluid enters the sample vessel 118. The sample vessel 118 is connected to the head unit 104 with an umbilical cable 124, and is stored at a home position within a hollow body 102 of the head unit 104 when the sample vessel 118 is not disposed in the fluid tank 110. The hollow body 102 is a pipe formed of steel or an equivalent metal or alloy. The hollow body 102 is open ended to allow the umbilical cable 124 to pass through its interior, and is cylindrical in nature to match the shape of the sample vessel 118 such that the sample vessel 118 fits within the hollow body 102. Furthermore, the hollow body 102 includes an upper flange 148 and a lower flange 154, which serve to connect the hollow body 102 to the remainder of the head unit 104 and to the upper flange 108 of the main isolation valve 106, respectively.

To collect samples within the fluid tank 110, the head unit 104 lowers the sample vessel 118 from the hollow body 102 of the head unit 104 to an upper position 112, a middle position 114, or a lower position 116 corresponding to upper, middle, and lower sampling levels within the fluid tank 110. As the sample vessel 118 is lowered to any of the upper position 112, the middle position 114, or the lower position 116, sample valves (e.g., FIG. 3) of the sample vessel 118 are opened and fluid enters the sample vessel 118. Any of the upper position 112, the middle position 114, and the lower position 116 may be considered a first, second, or third position corresponding to a first, second, or third level in the fluid tank 110. As described below, the sample vessel 118 is configured with multiple sampling chambers (e.g., FIG. 3) that allow the sample vessel 118 to keep the collected samples separate. Once the sample vessel 118 is drawn back to the head unit 104, the samples are dispensed from the sample vessel 118 through a sample collection port 130 of the hollow body 102, which is a pipe that allows an operator to collect samples by placing a container (not shown) at the sample collection port 130.

As shown in FIG. 1, the sample collection port 130 includes a solenoid valve 132 that actuates to fluidly connect the hollow body 102 to the aforementioned container (not shown). As is commonly known in the art, the solenoid valve 132 is operated by electromagnetically actuating a plunger (not shown) that opens and closes the sample collection port 130. The plunger (not shown) is sized to the interior diameter of the sample collection port 130 such that the plunger (not shown) abuts against the interior of the sample collection port 130 and fluidly seals the hollow body 102 from the container (not shown). The solenoid valve 132 is powered by a power box 136, and receives power and control signals from the controller 122.

The operation and function of the controller 122 is discussed in detail in association with FIGS. 6 and 8, and is briefly discussed below. The controller 122 includes a screen, such as a Liquid Crystal Display (LCD), Organic Light Emitting Diode (OLED), or equivalent, that displays a Graphical User Interface (GUI) that the user can interact with through the use of buttons and dials (e.g., FIG. 6). Via the controller 122, an operator can select to operate an electric motor 134 in a forward or reverse direction, which causes the sample vessel 118 to be raised or lowered within the fluid tank 110. The controller 122 also stores algorithms, processes, and/or formulas that operate sample collection valves of the sample vessel 118 in order to draw fluid into the sample vessel 118. Thus, overall, the controller 122 facilitates the collection of fluid samples by actuating the head unit 104 and the sample vessel 118. For its part, the controller 122 may be disposed on any part of the head unit 104 that is accessible by an operator, and is depicted as being disposed on the chamber head 128 in FIG. 1 as noted above. Alternatively, the controller 122 may be mounted in any convenient remote location or may be implemented in software, e.g., an application on a computer or a smartphone.

The controller 122 communicates with the sample vessel 118 by way of the umbilical cable 124. In particular, the umbilical cable 124 includes a steel pulling wire 350 that is fixed to the sample vessel 118 to allow the umbilical cable 124 to raise and lower the sample vessel 118 within the fluid tank 110. The umbilical cable 124 further includes a serial communication cable 125 that serve to transmit control and power signals to the sample collection valves (e.g., FIG. 3) of the sample vessel 118.

The umbilical cable 124 is wound around a spring reel (e.g., FIG. 2) disposed within a spring reel enclosure 152 of the head unit 104, and the spring reel (e.g., FIG. 2) and the spring reel enclosure 152 form part of a transport mechanism for moving the sample vessel 118. The spring reel enclosure 152 may be bolted or otherwise detachably connected to a chamber head 128. The chamber head 128 may be a steel or equivalent pipe that extends from the hollow body 102 to the spring reel enclosure 152 to form a protective casing for the umbilical cable 124. In addition, the chamber head 128 may provide a mounting surface for the controller 122 that stores and executes computer programs and/or processes to perform sampling operations with the tank sample system 100.

The spring reel (e.g., FIG. 2) is driven by an output shaft of the electric motor 134, which may be a Direct Current (DC) motor or equivalent motor that converts electrical power received from the power box 136 into rotational motion of a motor shaft 250. The power box 136 is configured to receive power from an external source (not shown), such as a power outlet, generator, or other Alternating Current (AC) power supply, via a power conduit 142. Functionally, the power box 136 transmits low voltage direct current to the electric motor 134 via a control conduit 146 according to actuation instructions output by the controller 122.

As noted above, the electric motor 134 operates a spring reel (e.g., FIG. 2), that coils and uncoils the umbilical cable 124 to convey the sample vessel 118. The spring-loaded reel is disposed within the spring reel enclosure 152 that is fixed to a clutch housing 144. The clutch housing 144 houses a selectively engageable electromagnetic clutch (e.g., FIG. 2) that allows the electric motor 134 to be selectively engaged or disengaged from the head unit 104. The power being delivered to the electromagnetic clutch (e.g., FIG. 2), is controlled with either a clutch lever 150 or the controller 122, based upon the operator's discretion. The clutch lever 150 allows an operator to manually disconnect power from the coil 145, causing a coil 145 to be de-energized and a hub 149 to become decoupled from a rotor 147.

The clutch box 138 is formed of a coupling plate 140 and a clutch housing 144. The coupling plate 140 provides a mounting surface for the electric motor 134, and the clutch housing 144 shields internal components of the clutch box 138, such as an electromagnetic clutch (e.g., FIG. 2), from an external environment of the head unit 104. The coupling plate 140 and clutch housing 144 are formed of steel, iron, an alloy, or an equivalent material known to a person of ordinary skill in the art. When the electric motor 134 is disengaged from the head unit 104, an operator manually operates the spring reel enclosure 152 by rotating a manual handle 126 of the spring reel enclosure 152.

In general, and as described above, components of the head unit 104 are connected to each other with bolts. Thus, the electric motor 134 is retained to the clutch box 138 by inserting a bolt (e.g., FIG. 2) through the coupling plate 140 of the clutch box 138 into the electric motor 134. Similarly, the clutch box 138 is bolted to the spring reel enclosure 152 by inserting a bolt through the clutch box 138 into the spring reel enclosure 152, or vice versa. The spring reel enclosure 152 is bolted to the chamber head 128, which, in turn, is bolted to the hollow body 102 that is bolted to the upper flange 108 of the main isolation valve 106. The above arrangement is exemplary only, and the components may be attached using equivalent structures, such as screws or rivets, or may be rigidly fixed thereto by a brazing or welding process, for example, or a combination thereof.

Figure 2:
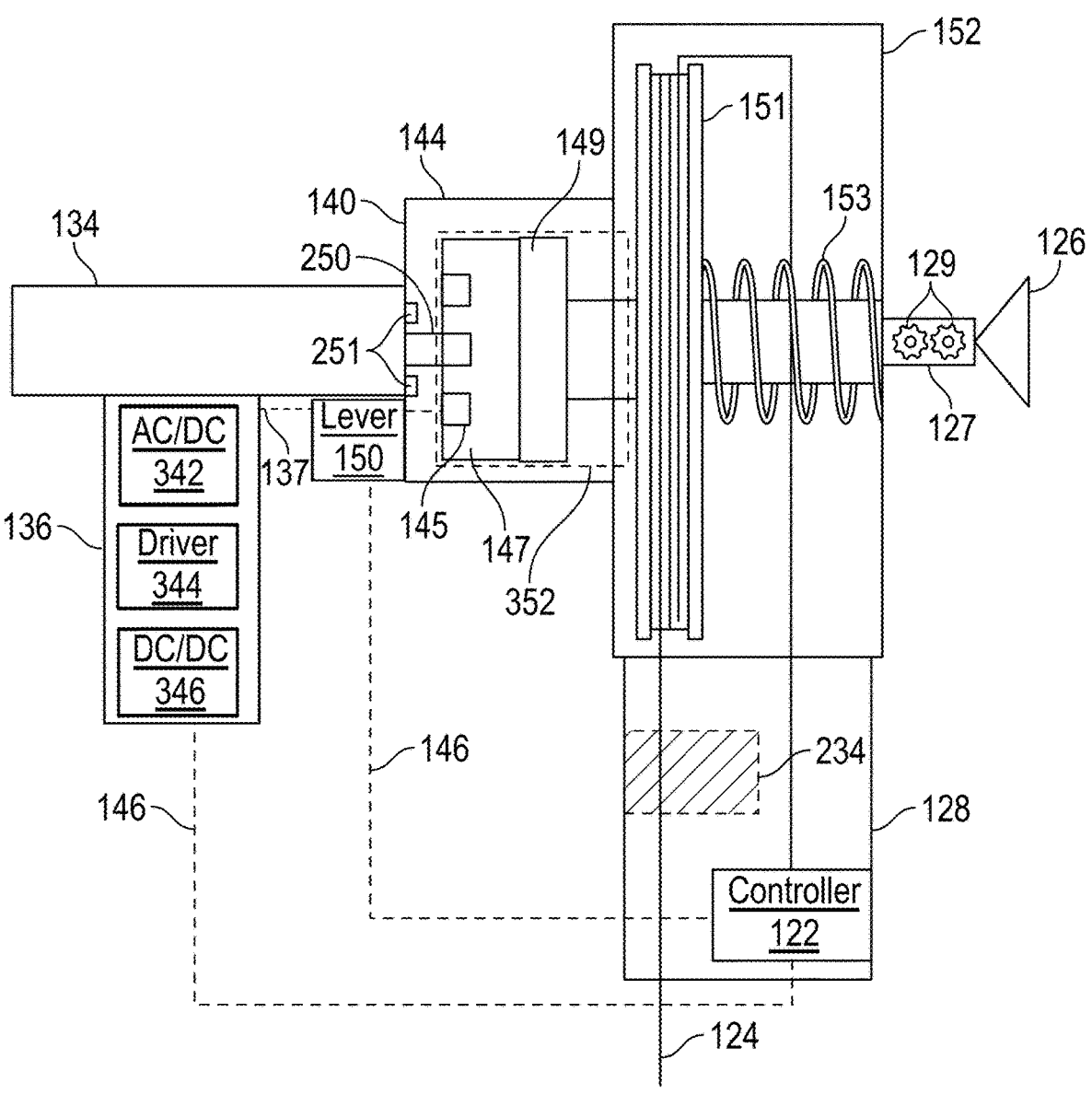
FIG. 2 depicts a spring reel enclosure and an electric motor in accordance with one or more embodiments.

FIG. 2 depicts a sample embodiment of the spring reel enclosure 152, the electric motor 134, and controller 122 in accordance with one or more embodiments of the invention. The controller 122 provides operating instructions to the power box 136 via the control conduit 146, which is a copper, aluminum, or equivalent wire. The operating instructions include, for example, an amount of power to be transmitted by the power box 136, a duration of time or a duty cycle for transmitting power, the electric motor 134 rotation direction, a type of power (AC or DC) to be transmitted, and a time at which power is to be transmitted by the power box 136. The power box 136 includes an AC/DC converter 342, a motor driver 344, and a DC/DC converter 346. The AC/DC converter 342 and DC/DC converter 346 serve to respectively convert AC or DC into low voltage DC, which is used to power the electric motor 134. The motor driver 344 functions as a switch that controls the rotational direction of the motor by adjusting the polarity of outgoing DC power according to whether the sample vessel 118 is being raised or lowered.

Thus, overall, the power box 136 transmits low voltage direct current to the electric motor 134 via the control conduit 146 according to actuation instructions output by the controller 122. Upon receiving operating instructions from the controller 122, which provide a rotational direction and a speed of rotation that the electric motor 134 should be driven at as described above, the power box 136 provides power to the electric motor 134 and monitors the operating speed thereof. The power box 136 further provides feedback on the operation of the electric motor 134 to the controller 122, allowing the controller 122 to detect if the electric motor 134 is unable to operate. Such feedback includes, for example, the actual amount of power transmitted to the electric motor 134, the runtime of the electric motor 134, the rotation speed of the electric motor 134, and equivalent metrics related to the power consumption of the electric motor 134.

As shown in FIG. 2, the clutch housing 144 houses an electromagnetic clutch 352 formed by the coil 145, the rotor 147, and the hub 149. The electric motor 134 is fixed with bolts 251 or otherwise detachably connected to a coupling plate 140, such that a motor shaft 250 of the electric motor 134 extends into the clutch housing 144 to couple to the rotor 147. The coil 145 is an aluminum or equivalent coil of wire that receives power from the power box 136 via a control line 137, and converts the received power into an electromagnetic field. The electromagnetic field acts upon the hub 149, which is a magnetized armature and housing that is fixed to a spring reel 151 that holds the umbilical cable 124. Thus, as the coil 145 creates a magnetic field, the hub 149 is pulled into contact with the rotor 147, which is formed of steel or an equivalent material. The friction connection between the rotor 147 and the hub 149 mechanically couples the hub 149, and thus the spring reel 151, to the electric motor 134. This, in turn, causes the spring reel 151 to rotate according to the rotation of the electric motor 134.

As is further shown in FIG. 2, a spring 153 connects the spring reel 151 to the spring reel enclosure 152. The spring reel 151 and spring reel enclosure 152, as well as associated components, such as the spring 153, the electric motor 134, and the electromagnetic clutch 352 may alternatively be referred to as a transport mechanism. The spring 153 may be formed of steel, aluminum, or an equivalent material, and provides a restorative force that assists in lifting the sample vessel 118 from the fluid tank 110. As such, the spring 153 is compressed as the sample vessel 118 is lowered through the fluid tank 110. In the event that an operator wishes to manually operate the tank sample system 100, the operator actuates the clutch lever 150, which is a throw switch that interrupts power transfer from the power box 136 to the coil 145, and thus the electromagnetic clutch 352. This causes the hub 149 to be decoupled from the rotor 147, and the spring reel 151 is instead rotated with the manual handle 126. In this case, the spring 153 provides force that assists the operator as the sample vessel 118 is lifted from the fluid tank 110. Such is advantageous because the sample vessel 118 will naturally be heavier while being lifted out of the fluid tank 110 due to the additional fluid weight, and the extra weight is offset by the restoring force provided by the spring 153.

To further assist with manual operation of the manual handle 126, the manual handle 126 is connected to a reduction gear mechanism 127 that connects to the spring reel 151. The reduction gear mechanism 127 includes gears 129 that are sized to increase the amount of torque at the spring reel 151 at the cost of the rotation speed of the manual handle 126. The increased torque provided by the reduction gear mechanism 127 is transmitted to the spring reel 151, which allows the operator to lift the sample vessel 118 that weighs substantially more than the operator can lift without the reduction gear mechanism 127. Thus, overall, by rotating the manual handle 126, the operator is able to manually wind and unwind the umbilical cable 124 from the spring reel 151 when the electric motor 134 is disengaged, which allows the sample vessel 118 to be raised or lowered without electrical assistance. The manual operation is particularly advantageous in combustible environments, as the spring reel 151 is operated without electricity that may initiate sparks near the fluid tank 110.

Figure 3:
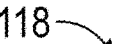
FIG. 3 depicts a sample vessel in accordance with one or more embodiments.
Figure 3:
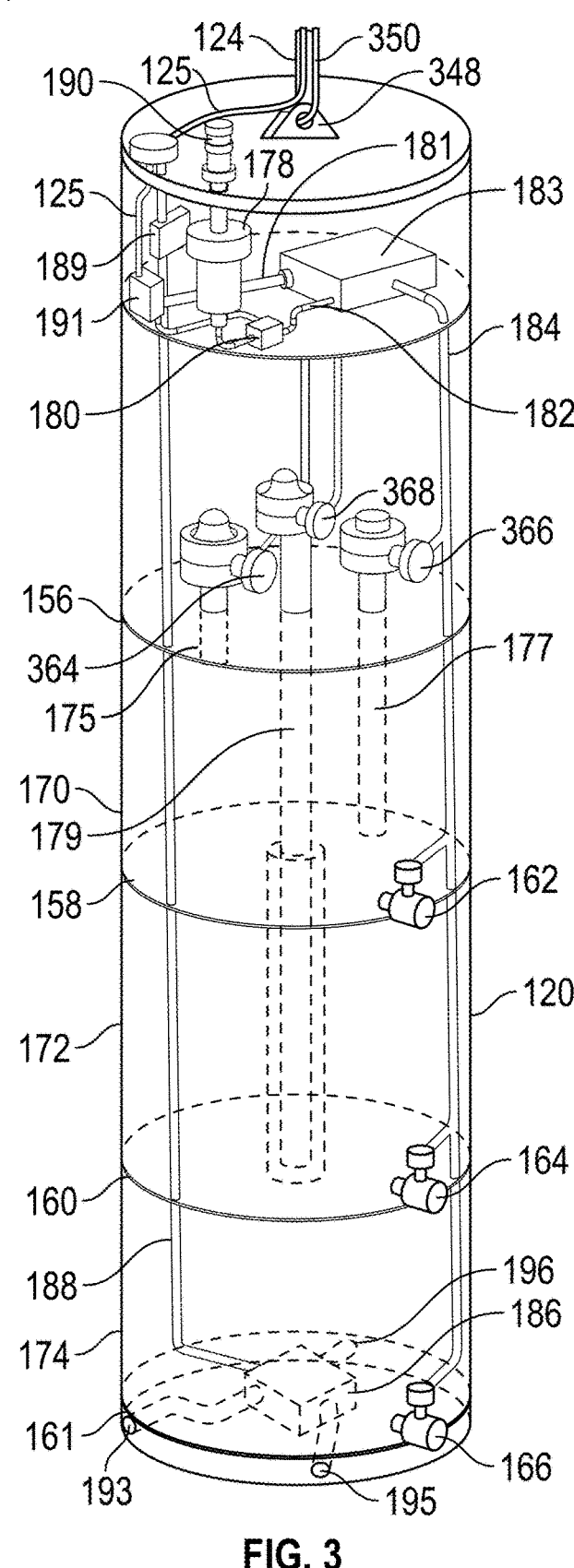

FIG. 3 depicts components of the sample vessel 118 in accordance with one or more embodiments. The sample vessel 118 is used to collect fluid samples from the fluid tank 110, in conjunction with other components of the tank sample system 100. As shown in FIG. 3, the sample vessel 118 includes a vessel body 120, which is a steel, iron, aluminum, or equivalent cylindrical wall that forms the exterior of the sample vessel 118. The interior of the vessel body 120 includes a plurality of sample chambers, such as first, second, and third sample chambers. In the exemplary embodiment shown, the plurality of sample chambers include an upper sample chamber 170, a middle sample chamber 172, and a lower sample chamber 174, collectively referred to as "sample chambers 170-174" herein. Any of the sample chambers 170-174 may be considered a first, second, or third sample chamber in any order. The sample chambers 170-174 may be used to collect fluid samples, including hydrocarbon products, such as fuels, at different depths within the fluid tank 110.

The sample chambers 170-174 are hermetically sealed from each other within the vessel body 120, such that samples are collected and stored independently while the sample vessel 118 is submerged within the fluid tank 110. More specifically, the upper sample chamber 170 is delimited by a first plate 156 and a second plate 158. Similarly, the middle sample chamber 172 is delimited by the second plate 158 and a third plate 160, and the lower sample chamber 174 is delimited by the third plate 160 and a fourth plate 161. The first plate 156, the second plate 158, the third plate 160, and the fourth plate 161 are formed of steel or an equivalent material, and are welded or brazed to an interior surface of the sample vessel 118 to ensure that each of the sample chambers 170-174 are hermetically sealed from each other. Although the various plates are labeled as the first plate 156, the second plate 158, the third plate 160, and the fourth plate 161, such is for illustrative purposes only and is not considered to be limiting with respect to the number or orientation of the plates of the sample vessel 118

As shown in FIG. 3, the sample vessel 118 is further equipped with an upper flush valve 162, a middle flush valve 164, and a lower flush valve 166, collectively referred to as "flush valves 162-166" herein. Any of the flush valves 162-166 may be considered a first, second, or third flush valve. The flush valves 162-166 are pneumatically actuated butterfly valves (or equivalent) that are selectively actuatable to provide fluid communication from the interior of the sample vessel 118 to the exterior of the sample vessel 118. The flush valves 162-166 may alternatively be embodied as ball valves, gate valves, globe valves, or equivalent. Once the sample vessel 118 is returned to the hollow body 102, the flush valves 162-166 are sequentially operated to deposit their respective samples outside of the sample vessel 118.

To actuate the flush valves 162-166, the flush valves 162-166 are connected to a manifold 183 with tubing 184, formed out of rigid materials, such as steel, aluminum, iron, or equivalent, or flexible materials, such as rubber, polyethylene, or silicone. The manifold 183 is a series of tubes or pipes, solenoids, and valves operated in conjunction with a single fluid source, and are reconfigurable to selectively distribute hydraulic power through the sample vessel 118. That is, the manifold 183 selectively opens and closes various interior valves and/or tubing lines with solenoids (not shown) or equivalent devices in order to route the pneumatic power from a bladder accumulator 178 to the flush valves 162-166, causing the flush valves 162-166 to actuate.

A command solenoid 191 is connected to the manifold 183 with tubing 184, and serves to select which configuration the manifold 183 operates in according to control signals from the controller 122. Specifically, the command solenoid 191 includes a digital to analog conversion unit (e.g., FIG. 8) with electrical contacts that receives control and power signals from the power box 136 via a serial communication cable 125 disposed on the interior of the umbilical cable 124. A level switch 189 similarly transfers signals and power via the serial communication cable 125, which may be formed of one or more of the following materials: glass, plastic, copper, aluminum, gold, or equivalent materials. Upon receiving the control signals, the command solenoid 191 energizes a plunger 181, which is a magnetized connecting shaft that extends between the command solenoid 191 and the manifold 183 to actuate the manifold 183. Actuating the manifold 183 includes reorienting the various interior valves and fluid lines (not shown) of the manifold 183 to selectively create a fluid connection between the bladder accumulator 178 and the flush valves 162-166.

The manifold 183 is connected to a bladder solenoid 180 that connects to the bladder accumulator 178, which then connects to a quick coupler 190. To fill the bladder accumulator 178, an operator connects an air or nitrogen compressor (not shown) or storage tank (not shown) to the quick coupler 190, which is a ridged pneumatic connection that is sized according to the transfer rate of the compressed gas. The operator proceeds to fill the bladder accumulator 178 with compressed air or nitrogen or a similar gas or fluid. The compressed air or nitrogen is selectively transferred from the bladder accumulator 178 to the manifold 183 by the bladder solenoid 180, which is interconnected to the bladder accumulator 178 and the manifold 183 by way of a bladder solenoid conduit 182. The bladder solenoid 180 is connected with a serial communication cable 125 to the command solenoid 191, such that the bladder solenoid 180 receives control signals from the controller 122 and actuates to fluidly connect or disconnect the bladder accumulator 178 to the manifold 183 via the bladder solenoid conduit 182. The bladder solenoid conduit 182 is a series of tubing lines that interconnects the manifold 183, the bladder accumulator 178, the quick coupler 190, and the bladder solenoid 180.

The manifold 183 is connected via the tubing 184 to a series of valves, including an upper sample valve 364, a middle sample valve 366, and a lower sample valve 368, collectively referred to as "sample valves 364-368" herein. The sample valves 364-368 are pneumatically actuated with air or other gas pressure from the manifold 183, which is transmitted through the tubing 184 to the sample valves 364-368.

Overall, the sample valves 364-368 are selectively actuated by the command solenoid 191 responsive to commands from the controller 122. The sample valves 364-368 may be embodied as butterfly valves, gate valves, globe valves, or equivalent valves that are selectively actuatable to provide fluid communication from the exterior of the sample vessel 118 to the interior of the sample vessel 118. That is, the sample valves 364-368 are disposed such that an inlet of the sample valve draws in fluid from the fluid tank 110, while an outlet of the sample valve is connected to a sample tube, as described below. Furthermore, the sample valves 364-368 may be embodied as hydraulically actuated or electrically actuated valves without departing from the nature of the invention.

The upper sample valve 364 is connected to the upper sample chamber 170 with an upper sample tube 175, which is a pipe that fluidly connects an outlet of the upper sample valve 364 to the upper sample chamber 170. Similarly, the middle sample valve 366 is fluidly connected to the middle sample chamber 172 via a middle sample tube 177, and the lower sample valve 368 is connected to the lower sample chamber 174 by a lower sample tube 179. The upper sample tube 175, the middle sample tube 177, and the lower sample tube 179 are collectively referred to as "sample tubes 175-179" herein, and any of the sample chambers 170-174 may be considered a first, second, or third sample chamber in any order.

During the process of drawing fluid into the sample vessel, fluid is pulled from the fluid tank 110 into the sample vessel 118 by way of the sample valves 364-368, and deposited into the sample chambers 170-174 by way of the sample tubes 175-179. Once a predetermined number of sample chambers have been filled, which may be any or all of the sample chambers 170-174, the sample vessel 118 is returned to the head unit 104. As the sample vessel 118 is lifted through the head unit 104, each of the sample valves 364-368 successively pass by the sample collection port 130. The movement of the sample vessel 118 is facilitated, in part, by attaching a steel pulling wire (with a knot, a brazing or welding process, a fastener, or equivalent procedure) to a triangularly-shaped flange 348 disposed on top of the vessel body 120. As the umbilical cable 124 is wound or unwound from the spring reel 151, the sample vessel 118 is correspondingly raised or lowered within the fluid tank 110. Once the sampling procedure is complete and the upper sample valve 364 reaches the sample collection port 130, the upper sample chamber 170 is emptied through the upper flush valve 162 and the sample collection port 130 into a container (not shown) to be retrieved by an operator as described above.

Figure 4:
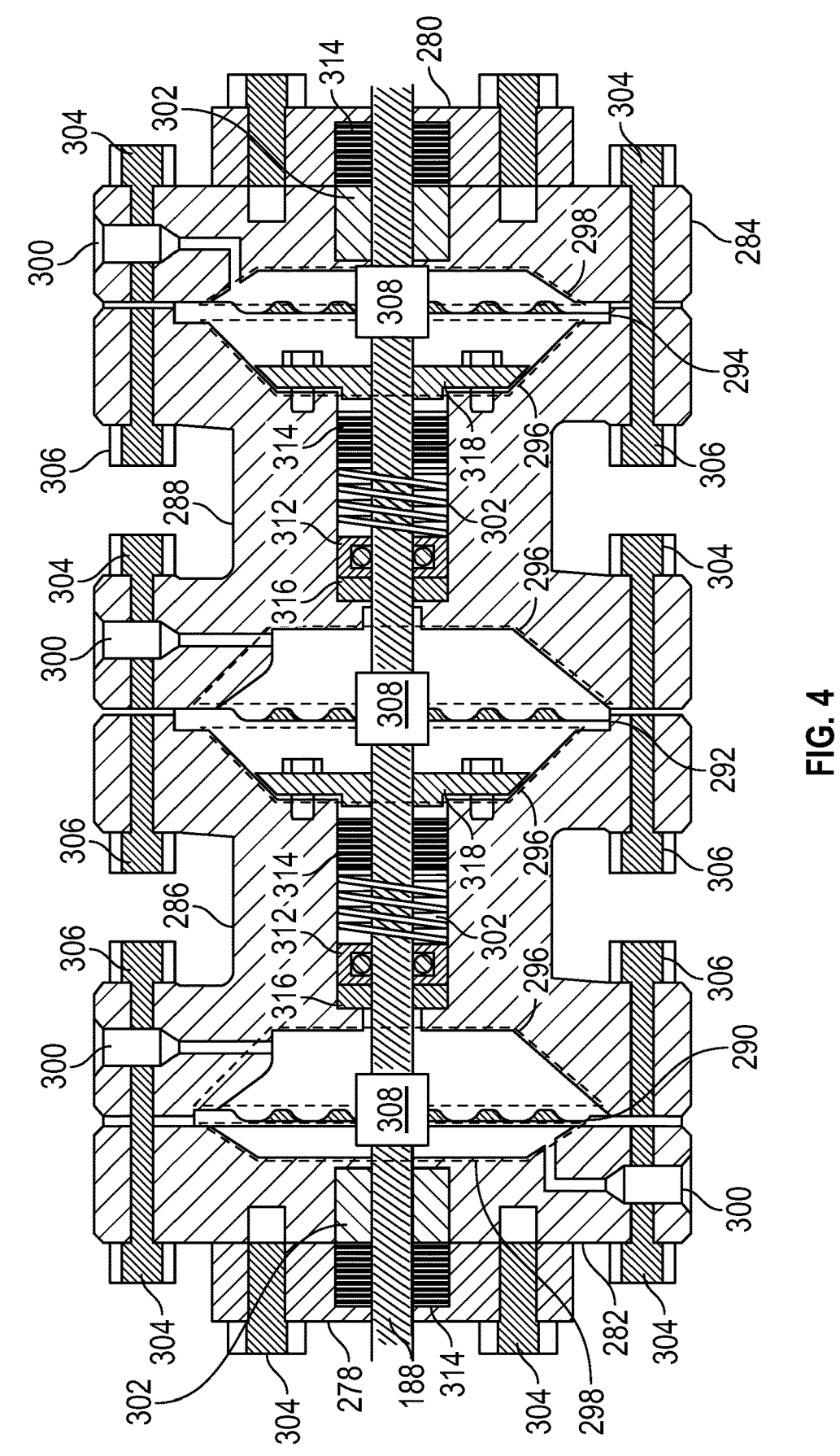
FIG. 4 depicts a tandem diaphragm switch in accordance with one or more embodiments.

In order to signal which of the sample valves 364-368 to actuate, and thus which of the sample chambers 170-174 to fill, the sample vessel 118 includes a tandem diaphragm switch 186, which is further described in FIG. 4. The tandem diaphragm switch 186 includes a first fluid inlet 193, a second fluid inlet 195, and a third fluid inlet 196, collectively referred to as fluid inlets 193-196, which serve to transmit fluid from the fluid tank 110 into the tandem diaphragm switch 186. As the sample vessel 118 is lowered in the fluid tank 110 the fluid pressure at the height of the sample vessel 118 increases, as is commonly known in the art. Thus, as the sample vessel 118 is lowered, the fluid pressure at the fluid inlets 193-196 increases. The tandem diaphragm switch 186 is connected to a tandem level switch conduit 188, and responds to the pressure differential of the fluid by actuating the tandem level switch conduit 188 to a distance corresponding to the fluid pressure, which is further discussed in conjunction with FIGS. 4 and 5. The level switch 189, which is further discussed in conjunction with FIG. 5, records the actuation distance of the tandem level switch conduit 188, and transmits the actuation distance to the controller 122. The controller 122 proceeds by transmitting operating instructions to the command solenoid 191, which operates the manifold 183 as described above. Thus, as a whole, the tandem diaphragm switch 186 and the manifold 183 form a remote actuation mechanism that operates in response to a signal from the controller 122 to select which of the sample valves 364-368 and/or the flush valves 162-166 are actuated.

FIG. 4 depicts a tandem diaphragm switch 186 in accordance with one or more embodiments of the invention. As shown in FIG. 4, the tandem level switch conduit 188 extends through a first diaphragm 290, a second diaphragm 292, and a third diaphragm 294 of the tandem diaphragm switch 186, collectively referred to as diaphragms 290-294 herein. The use of ordinal numbering while referring to the diaphragms 290-294 is for illustrative purposes only, and is not considered to be limiting with respect to the number of diaphragms that are present in a tandem diaphragm switch 186. Rather, the number of diaphragms 290-294 corresponds to the number of sampling chambers of the sample vessel 118. Thus, as the sample vessel 118 depicted in FIG. 3 is configured with three sample chambers, the tandem diaphragm switch 186 in FIG. 4 is depicted as having three diaphragms 290-294. However, if the number of sample chambers 170-174 changes, the number of diaphragms 290-294 will also vary corresponding to the new number of sample chambers 170-174.

As shown in FIG. 4, the first diaphragm 290 is retained within the tandem diaphragm switch 186 by way of a first retaining piece 282 and a first body piece 286. Similarly, the third diaphragm 294 is disposed between a second retaining piece 284 and a second body piece 288, while the second diaphragm 292 is disposed the first body piece 286 and the second body piece 288. The tandem level switch conduit 188 is further retained within the tandem diaphragm switch 186 by a first end piece 278 and a second end piece 280, which are fixed to the first retaining piece 282 and the second retaining piece 284, respectively. The first end piece 278, the second end piece 280, the first retaining piece 282, the second retaining piece 284, the first body piece 286, and the second body piece 288 are formed of steel, iron, aluminum, or an equivalent metal.

The first end piece 278 and the second end piece 280 are fixed to the first retaining piece 282 and the second retaining piece 284, respectively, with a bolt 304 that extends through the first end piece 278 into the first retaining piece 282. Similarly, the first retaining piece 282 and the second retaining piece 284 are respectively fixed to the first body piece 286 and the second body piece 288 with bolts 304 and nuts 306. The use of bolts 304 and nuts 306 to retain the various components of the tandem diaphragm switch 186 together is exemplary only, and the tandem diaphragm switch 186 may employ one or more alternative or additional connection means such as screws, adhesives, or rivets, for example.

The first body piece 286 is formed in the shape of an "x", where the sloped surfaces on the sides of the "x" shape forms a cavity 296 on either side of the first body piece 286. That is, the space between the first diaphragm 290 and the first body piece 286 forms one cavity 296, while the space between the first body piece 286 and the second diaphragm 292 forms another cavity 296. Similar cavities 296 exist in the second body piece 288. The cavity 296 is fluidly connected to the fluid tank 110 via a fluid inlet 300, which is a bore, pipe, or similar tube formed in the first body piece 286. As fluid fills the cavities 296, hydraulic pressure is exerted on the diaphragms 290-294, causing the diaphragms 290-294 to deflect.

In addition to the cavities 296, the tandem diaphragm switch 186 further includes a cutout 298 formed by the first retaining piece 282 such that fluid is retained in the space between the first retaining piece 282 and the cutout 298. Similarly, the tandem diaphragm switch 186 includes an additional cutout 298 formed by the second retaining piece 284 that retains fluid between the second retaining piece 284 and the third diaphragm 294. The cutouts 298 are depicted in FIG. 4 as being shaped as a trapezoid, but may be arcuate, rectangular, or any similar configuration without departing from the nature of this specification. The cutouts 298 function similar to the cavity 296 in that the cutouts 298 are fluidly connected to the fluid tank 110 by way of a fluid inlet 300 that extends through the first retaining piece 282 or the second retaining piece 284 to the fluid tank 110.

The diaphragms 290-294 may be formed of ceramic or the one or more of various metals described herein, and are rigidly fixed to the tandem level switch conduit 188 by a bushing 308. The bushing 308 is threaded to the tandem level switch conduit 188, and is welded, brazed, or otherwise fixed to the diaphragms 290-294 such that each of the diaphragms 290-294 are connected to the tandem level switch conduit 188. Each of the diaphragms 290-294 have a different thickness, and the thickness of a single diaphragm determines the diaphragm's physical properties that are responsive to hydraulic pressure of the fluid tank 110. Thus, each of the diaphragms 290-294 imparts a different amount of force on the tandem level switch conduit 188 depending on the depth of the sample vessel 118 within the fluid tank 110 and the thickness of the diaphragms 290-294.

For example, when the sample vessel 118 is lowered to an upper position 112 within the fluid tank 110 (e.g., FIG. 1), the first diaphragm 290 imparts a first force on the tandem level switch conduit 188. The second diaphragm 292 imparts force greater than that of the first diaphragm 290 on the tandem level switch conduit 188, while the third diaphragm

294 imparts a greater force on the tandem level switch conduit 188 than that of the second diaphragm 292. Continuing with the example, as the sample vessel 118 is lowered to the middle position 114 and the lower position 116, each of the respective forces on the tandem level switch conduit 188 from the diaphragms 290-294 will increase. Thus, the overall force acting on the tandem level switch conduit 188 is created by the combination of the diaphragms 290-294 and their respective actuation forces on the tandem level switch conduit 188.

To further assist with the actuation of the tandem level switch conduit 188, the tandem diaphragm switch 186 is further configured with a plurality of springs 302. Specifically, the first body piece 286 and the second body piece 288 each have a steel or equivalent metal spring 302 disposed on their interior. One side of the spring 302 abuts, but is not fixed to, a metal spring seat 312, while the other side of the spring 302 is fixed to a packing follower 314 that is fixed the tandem level switch conduit 188. The spring seat 312 is formed of metal such as steel or equivalent, and abuts against a packing washer 316 formed of plastic, rubber, or a similar polymer. The packing follower 314 is attached to the tandem level switch conduit 188 using a welding, brazing, or equivalent process. The packing follower 314 abuts against a diaphragm cover 318, which is a steel or equivalent plate that is fixed with bolts or screws to the respective first body piece 286 or second body piece 288.

The first retaining piece 282 and the second retaining piece 284 also include springs 302 that abut against packing followers 314 that are disposed in the first end piece 278 and the second end piece 280. The packing followers 314 are similarly fixed to the tandem level switch conduit 188, while the springs 302 compress against the first retaining piece 282 and the second retaining piece 284 during actuation. Additional packing followers 314 are disposed within the first end piece 278 and the second end piece 280, which retain the tandem level switch conduit 188 within the tandem diaphragm switch 186 at both ends of the tandem diaphragm switch 186. The packing followers 314 of the first end piece 278 and the second end piece 280 compress springs 302 disposed within the first retaining piece 282 and the second retaining piece 284. Thus, overall, the combination of the various springs 302 and the packing followers 314 assist with damping the motion of the tandem level switch conduit 188 within the tandem diaphragm switch 186. This damping effect, in turn, reduces variability in the pressure level readings output by the tandem diaphragm switch 186 to the controller 122 and, thus, the operator, which advantageously improves the ability of an operator to make timely decisions based on the consistent readings.

Figure 5:
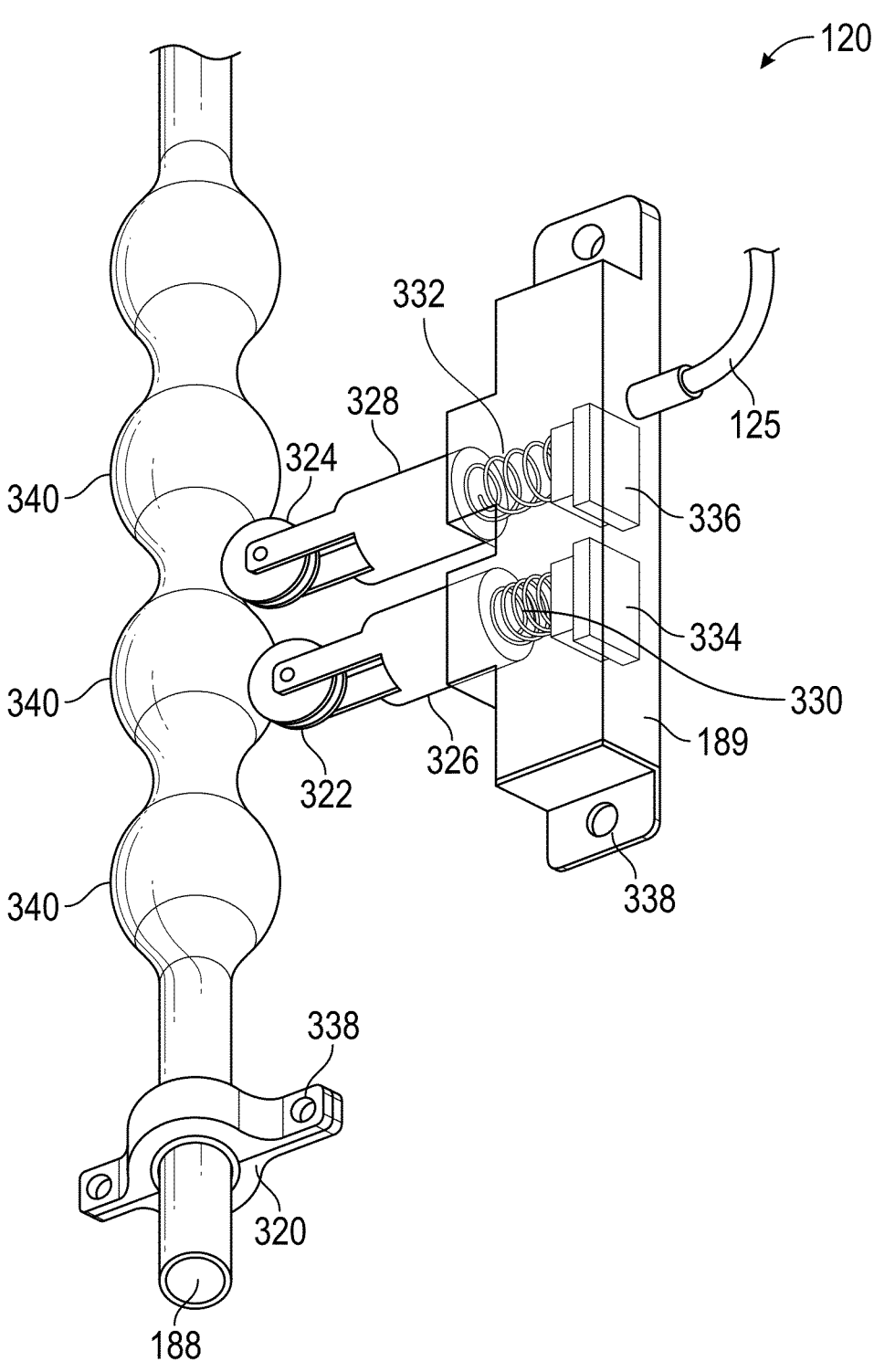
FIG. 5 depicts a level switch in accordance with one or more embodiments.

Turning to FIG. 5, FIG. 5 depicts one sample embodiment of a level switch 189, a tandem level switch conduit 188, and a vessel body 120 of a sample vessel 118 (e.g., FIG. 3) consistent with one or more embodiments of the invention. The level switch 189 and the tandem level switch conduit 188 are disposed within the vessel body 120 as described above. The tandem level switch conduit 188 is retained to the vessel body 120 with a roller bearing 320 that is configured to allow the tandem level switch conduit 188 to move in an axial (or vertical) direction, while restricting the motion of the tandem level switch conduit 188 in a radial (or horizontal) direction. Each of the level switch 189 and the roller bearing 320 include one or more bore holes 338 that allow a bolt (e.g., FIG. 4) to be inserted through the bore holes 338 and retain the level switch 189 and the roller bearing 320 to the vessel body 120.

As shown in FIG. 5, the level switch 189 includes a first wheel 322 and a second wheel 324 that pivotally connect to a first piston 326 and a second piston 328. A first spring 330 biases the first piston 326, and thus the first wheel 322, towards the tandem level switch conduit 188. As the tandem level switch conduit 188 translates through the roller bearing 320, ridges 340 of the tandem level switch conduit 188 force the first wheel 322, and thus the first piston 326, to actuate against the force provided by the first spring 330. This motion causes the first piston 326 to actuate a first switch 334 of the level switch 189, and the first switch 334 transmits a signal indicating the actuation to the controller 122 via the serial communication cable 125. Similarly, the second wheel 324 forces a second piston 328 to actuate against force provided by a second spring 332 such that the second spring 332 contacts a second switch 336, which also transmits a signal indicating the contact to the controller 122 via the serial communication cable 125.

Due to the physical separation between the first piston 326 and the second piston 328, the first piston 326 and the second piston 328 will actuate their respective first switch 334 and second switch 336 at different times. That is, and as shown in FIG. 5, the first wheel 322 is disposed at the apex of one of the ridges 340, while the second wheel 324 is disposed in a valley between two ridges 340. Thus, FIG. 5 depicts that the first spring 330 is compressed and the first piston 326 actuates the first switch 334, while the second spring 332 is compressed to a lesser degree than that of the first spring 330 and the second switch 336 is not pressed by the second piston 328. Any of the ridges 340 may be considered a "first", "second", or "third" ridge 340.

The number of ridges 340 of the tandem level switch conduit 188 corresponds to the number of sample chambers 170-174. Thus, as the sample vessel 118 contains three sample chambers 170-174, the tandem level switch conduit 188 includes three ridges 340 spaced at distances corresponding to the upper, middle, and lower positions of the sample vessel 118 within the fluid tank 110. As the tandem level switch conduit 188 translates through the roller bearing 320, the first wheel 322 will roll over the uppermost ridge 340, and the controller 122 signals that the upper sample valve 364 should be actuated to fill the upper sample chamber 170. The second wheel 324, the second piston 328, the second spring 332, and the second switch 336 form a backup switching mechanism for the level switch 189. That is, if the first piston 326 fails to actuate the first switch 334 prior to the second switch 336 being actuated, the controller 122 disregards signals from the first switch 334.

Alternatively, the tandem level switch 188 may utilize both the first switch 334 and the second switch 336 to create signals indicating the level of the sample vessel 118 in the fluid tank 110. In this case, the controller 122 confirms, for example, that the first switch 334 and the second switch 336 have been actuated, and initiates the sample collection process once the second switch 336 is actuated. Due to the multiple required actuations to operate the sample chambers 170-174, the controller 122 is less susceptible to false readings. Furthermore, the redundant actuation aids in ensuring that the controller 122 does not receive signals based upon debris present on the tandem level switch 188, as the debris will be cleared away by the motion of the first switch 334, and the second switch 336 will not actuate.

Figure 6:
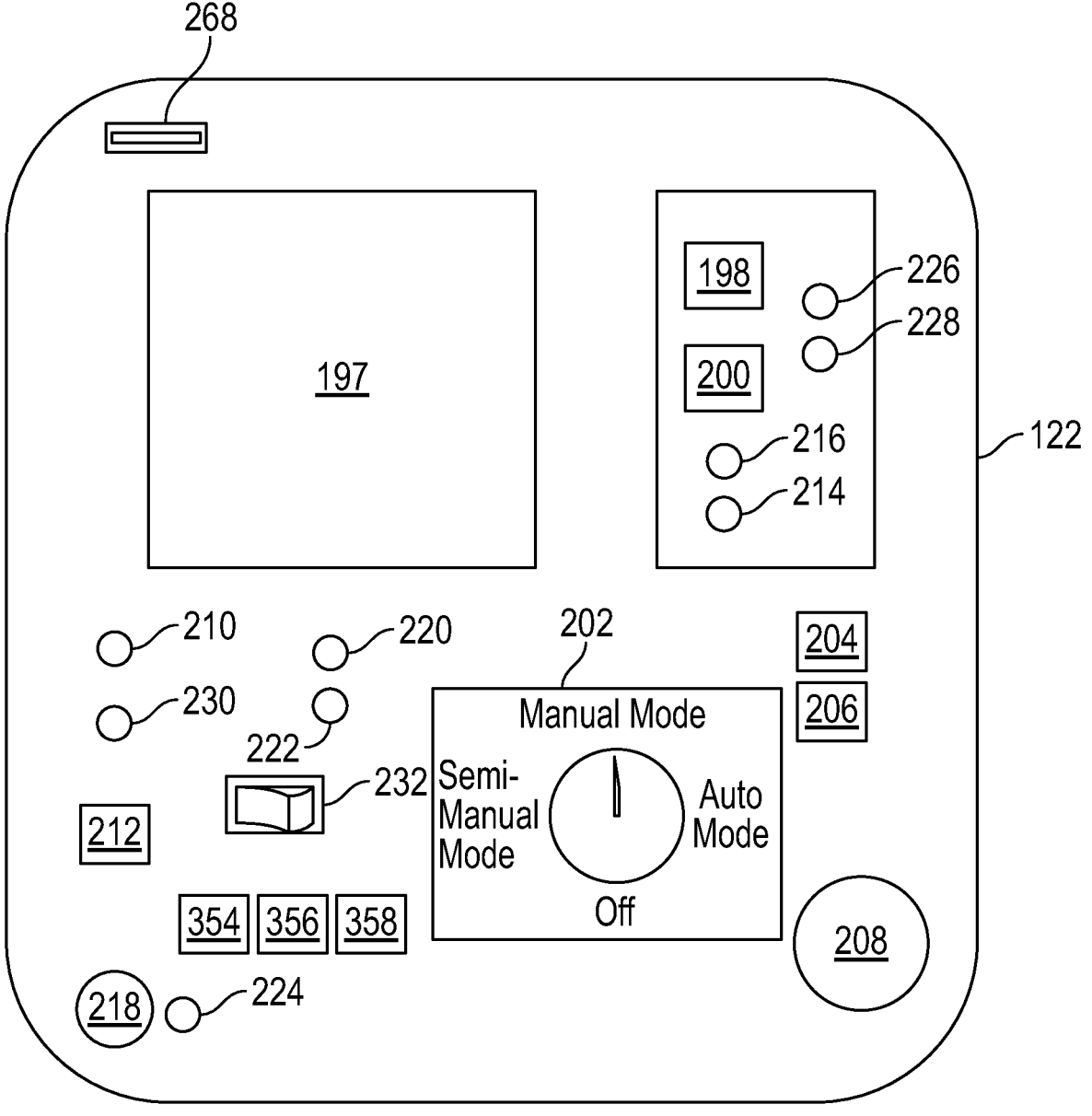
FIG. 6 depicts a controller in accordance with one or more embodiments.

FIG. 6 depicts a controller 122 in accordance with one or more embodiments. As described above, the controller 122 allows an operator to control the level of the sample vessel 118 within the fluid tank 110. The controller 122 includes a series of buttons that correspond to the functions of the sample vessel 118 and the head unit 104, and the functions of the various buttons are described below. Although FIG. 6 depicts the controller 122 as including various operating components such as switches, buttons, and dials, any of these components may be interchanged with a similar component.

Alternatively, the controller 122 may be embodied as including a touchscreen, and the various operating components recited previously replaced with their digital counterparts and icons related thereto.

As shown in FIG. 6, the controller 122 includes and communicates to a main display 197 that displays operating information to an operator using a Graphical User Interface (GUI). The operating information includes, for example, the depth of the sample vessel 118 within the fluid tank 110, as well as the direction of travel of the sample vessel 118. The direction of travel is indicated with an up arrow that corresponds to the sample vessel 118 being raised out of the fluid tank 110, or a down arrow that represents the sample vessel 118 being lowered into the fluid tank 110. Additionally, or alternatively, the direction of travel may be accompanied with a phrase such as "up" or "down".

Once the sample vessel 118 has reached a lowest desired position, or has returned to the hollow body 102, the main display 197 displays a message to an operator describing that the sample vessel 118 is at its maximum position. Such includes, for example, displaying a message to the operator stating "up end", meaning that the sample vessel 118 has returned to the "upper end" of its travel path, or the hollow body 102. Similarly, the main display 197 displays a "down end" message to an operator when the sample vessel 118 has reached the lowermost surface of the fluid tank 110. The messages displayed on the main display 197 further correspond to a high indicator light 216 and a low indicator light 214. For example, the high indicator light 216 illuminates when the sample vessel 118 reaches the upper end of its travel path, while the low indicator light 214 illuminates when the sample vessel 118 reaches the lower end of its travel path in the fluid tank 110.

The controller 122 is powered on and off through the use of a power button 218 that is connected to the control conduit 146, and, thus, the power conduit 142 and the power box 136. When the power button 218 is in an actuated position (or an "on" position), the power button 218 completes a circuit with the power box 136, and the controller 122 receives power from the power box 136 via the control conduit 146. This power is then distributed to various components of the controller 122 such as the main display 197 and various indicator lights of the controller 122 as described below. Furthermore, once power is received by the controller 122, a power light 224 illuminates to inform an operator that the controller 122 is receiving power and is operable.

Once the controller 122 has been powered on, an operator selects whether the sample vessel 118 will be operated in an automatic mode, a semi-manual mode, or a manual mode by way of a mode dial 202. The mode dial 202 is a digital or analog rotary switch or equivalent structure that is operably connected to the controller 122 such that the mode dial 202 transmits signals indicating the desired mode to the controller 122. The automatic mode, the semi-manual mode, and the manual mode are further described below.

In the automatic mode, the sample vessel 118 is sequentially lowered to each of the upper position 112, the middle position 114, and the lower position 116, at which point the controller 122 operates the sample valves 364-368 to collect samples. The sample vessel 118 is lowered to the upper position 112 and the upper sample valve 364 is actuated by the manifold 183 (e.g., FIG. 3). Subsequently, the sample vessel 118 is lowered to the middle position 114 and the middle sample valve 366 is actuated, and then lowered to the lower position 116 where the lower sample valve 368 is opened. After selecting the automatic mode, the operator can start collecting samples by pressing a start button 204 of the controller 122, and stop the operation by pressing an abort button 206 that de-energizes the coil 145 to decouple the spring reel 151 from the electric motor 134. It is again noted that it is possible for only some of the sample valves 364-368 to be operated to receive fluid samples, and not every fluid chamber must be filled with fluid as part of a sampling procedure.

In the semi-manual mode, the operator selects the operation of the sample vessel 118 by pressing buttons on the controller 122. Specifically, the controller 122 includes an up button 198 and a down button 200, which are both connected to the electric motor 134. When the up button 198 is pressed by an operator, the electric motor 134 is driven in a clockwise or counterclockwise direction, which causes the spring reel 151 to reel in the umbilical cable 124 and raise the sample vessel 118 out of the fluid tank 110. The down button 200 causes the electric motor 134 to rotate in an opposite direction, which lowers the sample vessel 118 into the fluid tank 110 by unwinding the umbilical cable 124 from the spring reel 151.

To operate the sample valves 364-368 in the semi-manual mode, the controller 122 includes an upper valve button 354, a middle valve button 356, and a lower valve button 358. The upper valve button 354, the middle valve button 356, and the lower valve button 358, collectively referred to as buttons 354-358 herein, are switches that send actuation signals via the controller 122 and the serial communication cable 125 to respectively operate the upper sample valve 364, the middle sample valve 366, and the lower sample valve 368. Once one of the buttons 354-358 is operated, the level switch 189, the command solenoid 191, the bladder solenoid 180, and the manifold 183 of the sample vessel 118 operate to open the respective sample valves 364-368, thereby pulling fluid into the respective sample chambers 170-174. After the respective sample chambers 170-174 are filled with fluid, the respective sample valves 364-368 are closed to prevent the sample from being contaminated. This process is repeated until a desired number of sample chambers 170-174 have been filled, at which point the up button 198 is pressed and the sample vessel 118 is lifted to the head unit 104.

As the sample vessel 118 is lifted through the hollow body 102 such that the sample vessel 118 is in the home position, each of the flush valves 162-166 will sequentially pass by the sample collection port 130. Thus, once a desired flush valve 162-166 is aligned with the sample collection port 130, an operator can press a drain chamber button 212 that operates the aligned flush valve 162-166 to discharge fluid from the respective sample chambers 170-174. Additionally, when the drain chamber button 212 is pressed the solenoid valve 132 is operated to provide fluid communication between the hollow body 102 and an exterior environment of the tank sample system 100. To facilitate the discharge process and assist an operator, the controller 122 may further include an indication light (not shown) that illuminates when any flush valve is aligned with the sample collection port 130.

In the manual mode, the electric motor 134 is disconnected from the spring reel 151 using the hub 149 and the rotor 147, as described above. Thus, the spring reel 151 is operated by rotating the manual handle 126 and the spring reel 151, which coils or uncoils the umbilical cable 124 from the spring reel 151. The actuation of the spring reel 151 is further assisted by the conveyor mechanism 234, which is further described in conjunction with FIGS. 7A and 7B. To allow for fluid samples to be gathered during a manual mode, the drain chamber button 212 and the buttons 354-358 remain operable in both the semi-manual mode and the manual mode.

The controller 122 further includes an up indicator light 226 and a down indicator light 228 that operate in conjunction with the up button 198 and the down button 200, respectively. That is, during a semi-manual operation the up indicator light 226 brightens at the same time as the up button 198 is pressed, while the down indicator light 228 illuminates when the down indicator light 228 is operated. During automatic operations, the up indicator light 226 and the down indicator light 228 illuminate in time with the motion of the electric motor 134.

In addition to controlling the direction of travel of the sample vessel 118, the controller 122 includes a clutch switch 232 that is electrically connected to the clutch lever 150 and the power box 136. The clutch switch 232 is a three way switch coupled to the clutch lever 150 that changes from a first position to a second position. In the first position, the clutch switch 232 provides power from the power box 136 to the coil 145 (e.g., FIG. 2), causing the electric motor 134 to be mechanically coupled to the spring reel 151. In the second position, the clutch switch 232 disconnects the coil 145 to disengage the electric motor 134 from the spring reel 151. The positions of the clutch switch 232 are reflected by an engaged light 220 that illuminates when the electric motor 134 is mechanically coupled to the spring reel 151, and by a disengaged light 222 that illuminates when the electric motor 134 is mechanically disconnected from the spring reel 151.

In the event that the controller 122 is unable to complete any of the commands requested by the operator, the controller 122 includes a fault light 230 and an emergency shutdown button 208. The emergency shutdown button 208 connects to the control conduit 146 and the power box 136, which transmits power to the controller 122 as described above. Thus, the emergency shutdown button 208 interrupts the flow of power to the power box 136 and stops the actuation of the electric motor 134. The controller 122 is connected to the emergency shutdown button 208 and monitors the status of signals sent by the emergency shutdown button 208. In the event that the emergency shutdown button 208 is pressed, the controller 122 illuminates the fault light 230 to indicate that the controller 122 has entered an emergency shutdown mode and ceased collecting samples.

The fault light 230 is further configured to illuminate when the controller 122 enters a fault state. A fault state is a state of the controller 122 in which the controller 122 cannot complete a requested operation. Such a fault state can occur, for example, when the up button 198 is pressed simultaneous to the down button 200, and the controller 122 cannot simultaneously perform both operations. Alternatively, a fault state could occur if the umbilical cable 124 of sample vessel 118 is stuck in the fluid tank 110, and the electric motor 134 begins drawing a high amount of power from the power box 136. While the fault light 230 is illuminated, the controller 122 disconnects the electric motor 134 from the power source via the power box 136 and the sample vessel 118 is prevented from being raised or lowered. Additionally, while in the fault state, the controller 122 may disconnect the electric motor 134 from the spring reel 151 to prevent damage to the sample vessel 118.

Overall, the controller 122 provides data on the operation status of the head unit 104 and the sample vessel 118 through the various lights described above. The various lights, including the fault light 230, the engaged light 220, the disengaged light 222, the up indicator light 226, the down indicator light 228, the high indicator light 216, the low indicator light 214, and the power light 224 each include at least one Light Emitting Diode (LED). Furthermore, the various lights are each assigned different colors of LEDs, which assists an operator in distinguishing whether any single light is on or off. The LEDs also aid in verifying the overall status of the controller 122 in industrial environments due to giving off light, allowing the LEDs to provide status even when the LEDs are lightly covered in contaminants such as dust or oil.

While the lights described above allow the controller 122 to communicate with an operator to determine the status of a sample vessel 118, the controller 122 receives instructions from the operator in part by way of a communication port 268. The communication port 268 is a Universal Serial Bus (USB) port or equivalent means of transferring data that allows the controller 122 to be programmed with algorithms or processes, and to output logistical data concerning the operation of the sample vessel 118. Such logistical data may include, for example, a running time of the sample vessel 118, sample collection times, sample collection depths within the fluid tank 110, and other data associated with the sample collection process.

Figure 7A:
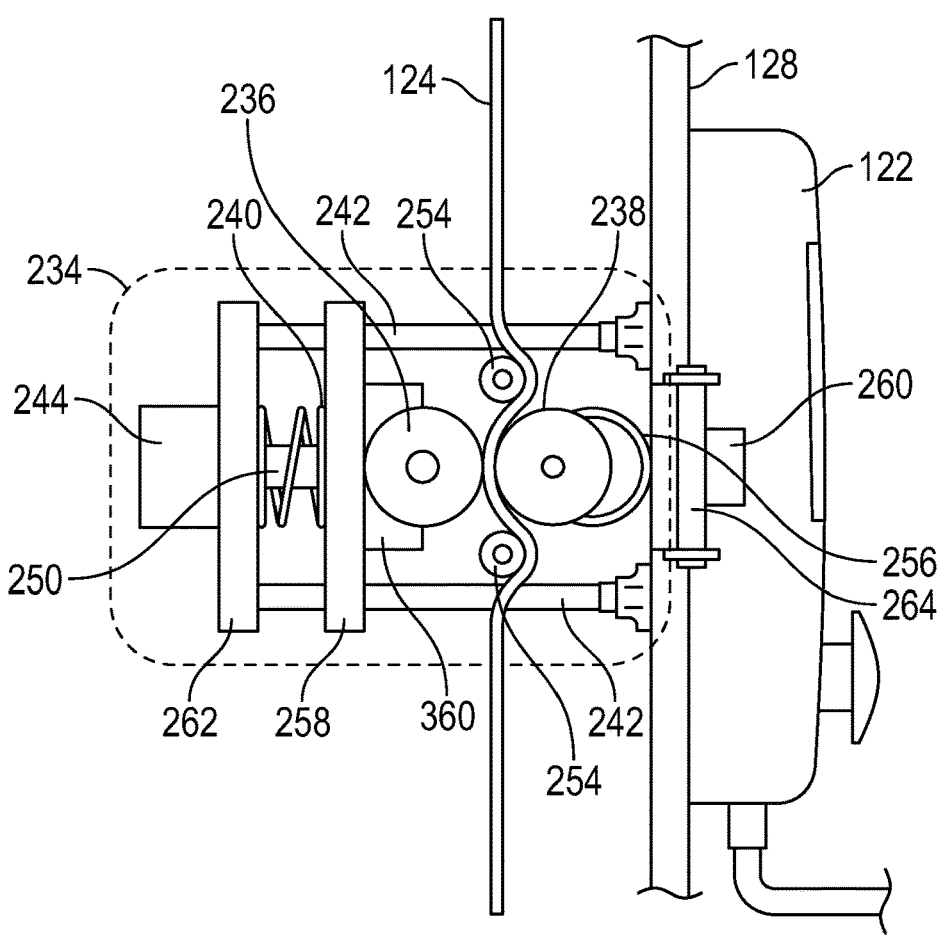
FIG. 7A depicts components of a conveyor mechanism in accordance with one or more embodiments.
Figure 7B:
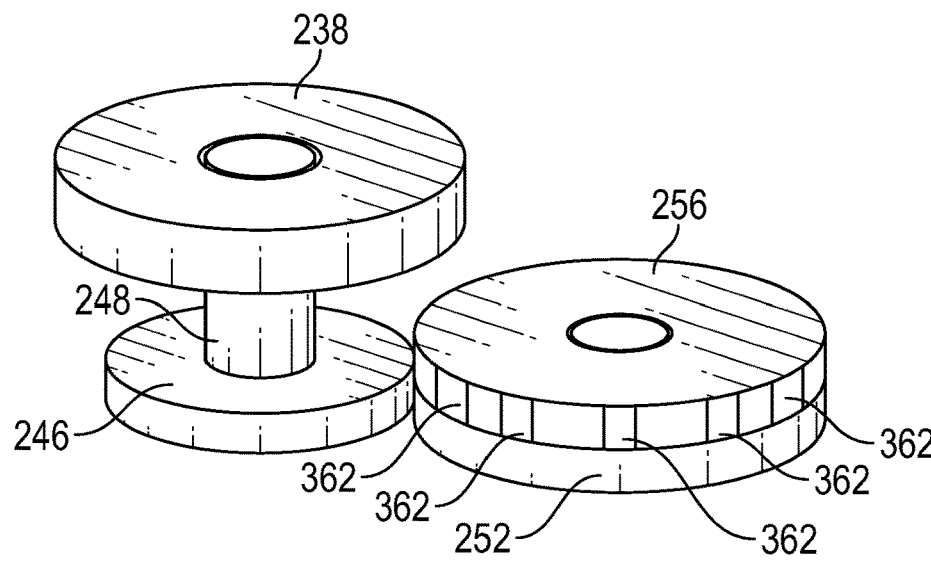
FIG. 7B depicts an encoder in accordance with one or more embodiments.

Turning to FIG. 7A, FIG. 7A depicts components of a conveyor mechanism 234 that operates to assist lifting the sample vessel 118 out of a fluid tank 110 during manual operations. The conveyor mechanism 234 is disposed within the chamber head 128 opposite of the controller 122, such that the spring reel enclosure 152 is disposed vertically above the conveyor mechanism 234. This arrangement allows the umbilical cable 124 to extend through the conveyor mechanism 234 such that the umbilical cable 124 may be actuated with either the electric motor 134 or the conveyor mechanism 234 as described below. Unless otherwise noted, components of FIG. 7A may be formed of any industrial strength metal such as steel, iron, titanium, copper, an alloy, or equivalent material known to a person of ordinary skill in the art.

As shown in FIG. 7A, the conveyor mechanism 234 includes a pull wheel 236 and a counter wheel 238 that provide primary contact surfaces for the umbilical cable 124. The counter wheel 238 is attached to the chamber head 128 with a pivot connection such as a rod and bearing that allows the counter wheel 238 to rotate at a fixed position within the chamber head 128. On the other hand, the pull wheel 236 is actuated with an actuation motor 244, and is biased to push the umbilical cable 124 against the counter wheel 238. The umbilical cable 124 is further retained to the counter wheel 238 by a plurality of support wheels 254, which are radially dispersed around the counter wheel 238.

Thus, overall, the umbilical cable 124 is in contact with the pull wheel 236, the counter wheel 238, and the support wheels 254. Optionally, and although not depicted in FIG. 7A, the pull wheel 236, the counter wheel 238, and the support wheels 254 may include concavities or convexities that form grooves and peaks on surfaces that contact the umbilical cable 124. These grooves and peaks serve to better retain the umbilical cable 124 within the conveyor mechanism 234, and provide more surface area to contact the umbilical cable 124 than their smooth counterparts.

To actuate the pull wheel 236, the pull wheel 236 is connected to the actuation motor 244 by way of a motor shaft 250 and a gearbox 360. The pull wheel 236 is fixed to an output shaft of the gearbox 360, while the motor shaft 250 extends into the gearbox 360. The gearbox 360 includes one or more bevel gears, worm gears, or equivalent components that serve to redirect the actuation direction of the motor shaft 250 by 90 degrees, which allows the circumference of the pull wheel 236 to extend in the same direction as the motor shaft 250 as shown in FIG. 7A. Due to the fixed nature of the actuation motor 244 and the moving nature of the pull wheel 236, the motor shaft 250 may be splined such that the gearbox 360 can slide along the motor shaft 250 and still receive rotation motion therefrom. Any number of potential gearbox designs may be used without departing from the nature of the invention, and may include features to reduce or increase the speed and/or torque of the pull wheel 236, as well as safety devices or sensors to monitor and/or control the pull wheel 236.

The actuation motor 244 is mounted on a first mounting plate 262, which is a steel or equivalent disc that the motor shaft 250 extends through. The first mounting plate 262 is connected to the chamber head 128 with a series of support rods 242, which are steel or equivalent beams that are welded or bolted to the first mounting plate 262 and the chamber head 128 above and below the pull wheel 236. The pull wheel 236 is attached to a second mounting plate 258, which is separated from the first mounting plate 262 by a spring 240. The spring 240 serves to bias the pull wheel 236 against the umbilical cable 124, and further increases the amount of friction therebetween. The increased friction prevents the umbilical cable 124 from slipping on the counter wheel 238 as the sample vessel 118 is raised and lowered in the fluid tank 110.

In addition to providing support for the umbilical cable 124, the counter wheel 238 also facilitates the collection of data concerning the location of the sample vessel 118 within the fluid tank 110. In particular, and turning to FIG. 7B, the counter wheel 238 is connected to an encoder pinion 246 with an encoder pinion shaft 248. The encoder pinion shaft 248 is rigidly fixed to both the counter wheel 238 and the encoder pinion 246 such that the encoder pinion shaft 248 mechanically couples the motion of the counter wheel 238 to the encoder pinion 246. The encoder pinion 246 meshes with an encoder main gear 252, and an encoder 256 having the same diameter as the encoder main gear 252 is fixed to the surface of the encoder main gear 252. The encoder 256 is formed as a solid disc with magnetic bits 362, formed as embedded or adhered prisms of magnetized metal, disposed in intervals along its perimetral edge. Furthermore, the encoder 256 may be fixed to the encoder main gear 252 with adhesives, a welding process, a brazing process, or equivalent procedure. Thus, when the encoder main gear 252 rotates, the encoder 256 rotates therewith, causing a magnetic field created by the magnetic bits 362 to rotate as well.

Returning to FIG. 7A, the chamber head 128 includes a non-metallic isolation flange 264 that separates the encoder 256 from a hall effect sensor 260. The non-metallic isolation flange 264 may be formed, for example, out of plastic or a similar non-metallic polymer. When the magnetic field formed by the magnetic bits 362 of the encoder 256 is rotated (due to the rotation of the counter wheel 238 from the umbilical cable 124), the hall effect sensor 260 captures changes in the strength of the magnetic field at the location of the hall effect sensor 260. The hall effect sensor 260 transfers the magnetic field changes to the controller 122, which correlates the changes of the magnetic field to the amount of rotation of the encoder 256 and the counter wheel 238. Due to the contact between the umbilical cable 124 and the counter wheel 238, changes in the rotation of the counter wheel 238 correspond to the displacement of the umbilical cable 124, which allows the controller 122 to measure the distance that the sample vessel 118 is lowered within the fluid tank 110 via the hall effect sensor 260.

As discussed above, the tank sample system 100 is capable of being operated in either a manual mode or an automatic mode. In the manual mode, the conveyor mechanism 234 is operated at a low speed, and an operator synchronously rotates the manual handle 126 to raise and lower the sample vessel 118. The controller 122 may also operate based upon the opposite arrangement, where the conveyor mechanism 234 controls the rotation speed to match the rotation of the manual handle 126, as measured with the encoder 256. Alternatively, in the automatic mode, the controller 122 controls the speed of the actuation motor 244 to match the speed of the electric motor 134. This prevents the actuation motor 244 from being damaged by the electric motor 134, as the electric motor 134 has a higher power rating than that of the actuation motor 244 in order to lift the sample vessel 118 when the sample vessel 118 is full of fluid.

Figure 8:
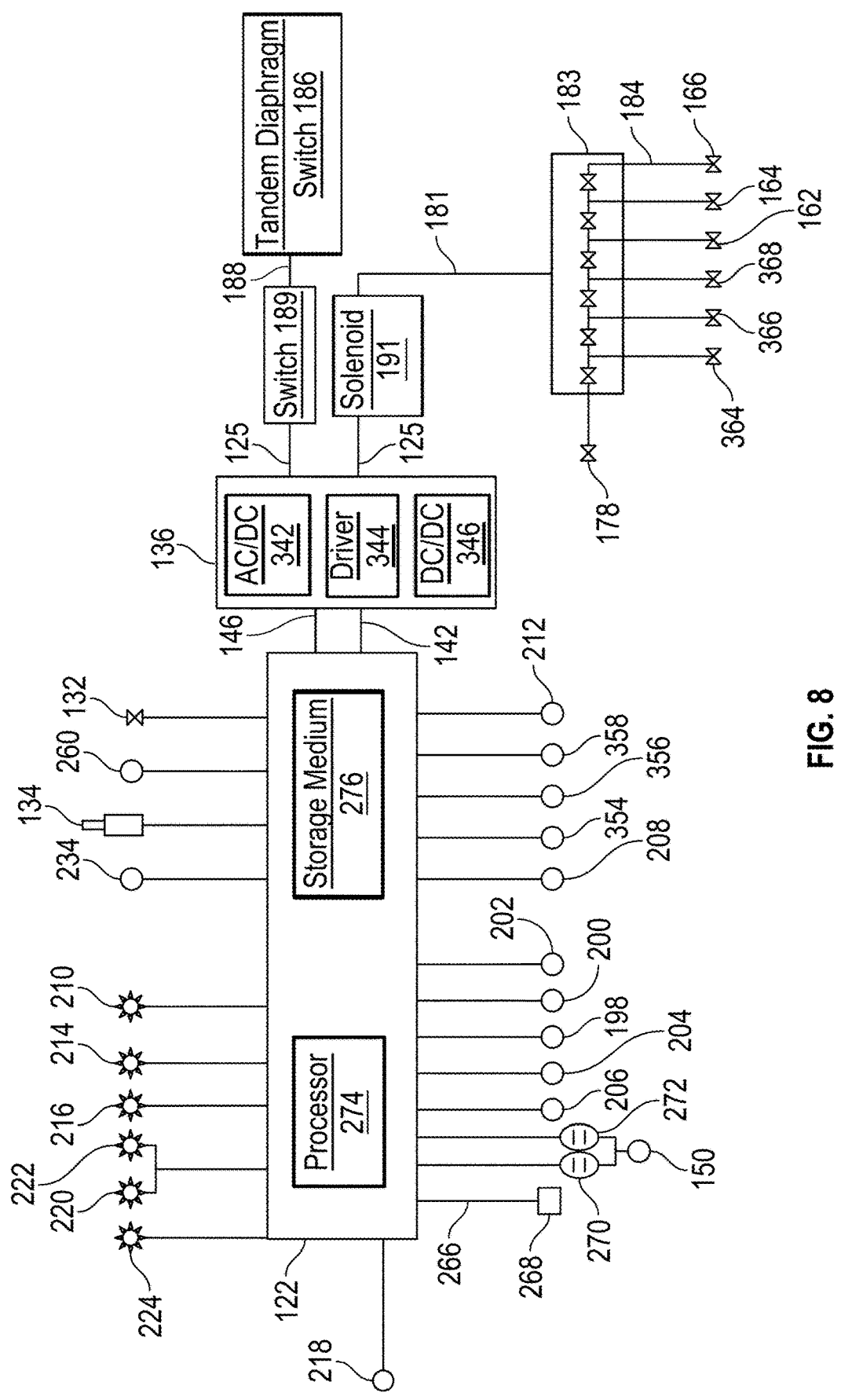
FIG. 8 depicts a block diagram in accordance with one or more embodiments.

FIG. 8 depicts a schematic diagram illustrating one or more embodiments of the invention. As shown in FIG. 8, a controller 122 is connected to multiple components that collectively operate to raise and lower a sample vessel 118 within a fluid tank 110. The controller 122 is formed by a processor 274 that executes computer software including programs, applications, code, or similar instructions that enable a computer to perform a desired sequence of events. The processor 274 may alternatively be embodied as a microcontroller, a microprocessor, or equivalent device for executing programmed instructions. The controller 122 also includes a non-transient storage medium 276, such as Random Access Memory (RAM), a Hard Disk Drive (HDD), a Solid State Drive (SSD), or equivalent device that stores the aforementioned computer software.

In general, components of FIG. 8 connected to the controller 122 are connected with a data bus 266, which is a series of wires that interconnect various other components of the tank sample system 100 to the controller 122. Initially, power is transferred to the controller 122 when a power button 218 is actuated by an operator, which connects the controller 122 to a power conduit 142 to power other components of the controller 122. A power light 224 reflects whether the controller 122 is receiving power by illuminating when the power button 218 is actuated.

Once powered on, an operator can communicate with the controller 122 through a communication port 268 that allows data to be transferred to and from the controller 122. Such data includes operating instructions such as algorithms, processes, and methods that operate the sample vessel 118 to collect fluid samples. The communication port 268 may be embodied as a Universal Serial Bus (USB) port (including various USB subtypes and standards), an ethernet port, or other equivalent forms of transmitting data. Alternatively, the controller 122 may include a Bluetooth controller (not shown) and/or Wi-Fi controller (not shown) that allows the operator to connect to the controller 122 with another device such as a smartphone (not shown) or computer (not shown).

To initiate a sampling process, an operator first selects whether the sample vessel 118 will automatically, semi-manually, or manually collect fuel samples. In an automatic mode of operation, an operator can choose to initiate the sampling process with a start button 204, and can complete the sampling process with an abort button 206. In the semi-manual mode, an operator can select to raise and lower the sample vessel 118 with an up button 198 and a down button 200, respectively. In the manual mode, the sample vessel 118 is raised and lowered by rotating a manual handle 126. The operation mode (automatic, semi-manual, or manual) is alternatively selected through the use of a mode dial 202 that is connected to the controller 122.

While the sample vessel 118 is disposed in the fluid tank 110, the upper sample valve 364, the middle sample valve 366, and the lower sample valve 368 are respectively operated with an upper valve button 354, a middle valve button 356, and a lower valve button 358 that connect to the controller 122. During this process, an operator presses the buttons 354-358, which transmit signals to the controller 122 to operate their respective sample valves 364-368. The controller 122 transmits operating instructions via the power conduit 142 to the power box 136, which are transmitted with a serial communication cable 125 of an umbilical cable 124 to a level switch 189 and a command solenoid 191. The level switch 189 is connected to a tandem diaphragm switch 186 via a tandem level switch conduit 188, and the tandem level switch conduit 188 transmits the current depth of the sample vessel 118 within the fluid tank 110 using hydraulic pressure. The command solenoid 191 translates digital instructions transmitted from the controller 122 into physical motion by energizing a plunger 181 that operates a manifold 183. Thus, the level switch 189 and the command solenoid 191 collectively operate to convert electrical (i.e., digital) instructions from the controller 122 into physical motion from the sample vessel 118, and vice versa.

The manifold 183 is connected to a bladder accumulator 178 to receive charged gas, such as compressed air or nitrogen, that actuates each of the sample valves 364-368 and the flush valves 162-166. Once one of the sample valves 364-368 is actuated, fluid from the fluid tank 110 is pulled into the respective sample chambers 170-174 via the sample tubes 175-179. On the other hand, once the sample vessel 118 has returned to the home position within the head unit 104, an operator presses a drain chamber button 212, which causes an upper flush valve 162, a middle flush valve 164, or a lower flush valve 166 that is aligned with a sample collection port 130 to operate. The operation of the flush valves 162-166 causes the respective fluid sample disposed in the respective sample chambers 170-174 to be emptied into the sample collection port 130. The sample collection port 130 is sealed with a solenoid valve 132 that operates simultaneous to the drain chamber button 212 being pressed to allow fluid communication between the head unit 104 and an exterior environment of the tank sample system 100.

To further assist with actuating the sample vessel 118 into and out of the fluid tank 110, the controller 122 is connected to a conveyor mechanism 234 and an electric motor 134. During a sampling operation, the electric motor 134 operates a spring reel 151, disposed inside of the spring reel enclosure 152, that coils and uncoils the umbilical cable 124 to raise and lower the sample vessel 118. On the other hand, the conveyor mechanism 234 includes a pull wheel 236 that imparts a friction force on the umbilical cable 124. This friction force, coupled with the rotation of the pull wheel 236, causes the umbilical cable 124 to raise or lower the sample vessel 118 within the fluid tank 110. The umbilical cable 124 also causes a counter wheel 238 to rotate, thereby causing an encoder 256 that is coupled to the counter wheel 238 to rotate therewith. The encoder 256 includes a series of magnetic bits 362 that create a magnetic field that interfaces with a hall effect sensor 260. The hall effect sensor 260 transmits changes in the magnetic field to the controller 122, which correlates the changes to a distance of the umbilical cable 124 as described above.

When the sample vessel 118 is disposed within the head unit 104, a high indicator light 216 illuminates to indicate that the sample vessel 118 has reached the end of its travel path. Similarly, when the sample vessel 118 has reached the bottom of the fluid tank 110, the controller 122 lights up a low indicator light 214. The status of the sample vessel 118 is further indicated from the controller 122 to an operator by a sampling complete light 210 and a fault light 230. The sampling complete light 210 indicates that the sample vessel 118 has filled a required amount of sampling chambers (i.e., 1, 2, or 3 chambers) with fluid from the fluid tank 110. The fault light 230 is instructed by the controller 122 to indicate that the controller 122 is unable to proceed with the sampling process, which may occur if the electric motor 134 becomes damaged, for example.

The fault light 230 is also triggered when an emergency shutdown button 208 is pressed to alert the operator that the controller 122 is not proceeding with the sampling procedure. When the emergency shutdown button 208 is pressed, the emergency shutdown button 208 instructs the controller 122 to stop transmitting power to the electric motor 134. Alternatively, the emergency shutdown button 208 may be connected in series in a circuit between the power box 136 and the electric motor 134, and disconnect the electric motor 134 from the power box 136 if pressed.

The power box 136 includes an AC/DC converter 342, a motor driver 344, and a DC/DC converter 346. The AC/DC converter 342 and the DC/DC converter 346 convert high voltage AC power and high voltage DC power into low voltage DC power that powers the electric motor 134. The motor driver 344 is a reversing switch that controls the rotational direction of the motor to control the current direction of the low voltage DC power according to whether the sample vessel 118 is being raised or lowered. Thus, overall, the power box 136 transmits low voltage DC power to the electric motor 134 via a control conduit 146 according to actuation instructions output by a controller 122 as shown in FIG. 8.

In the event that the electric motor 134 becomes damaged, or if it is desired to manually operate the spring reel enclosure 152 with the manual handle 126, an operator actuates a clutch lever 150. The clutch lever 150 is connected to an electromagnetic clutch 352 that selectively couples and decouples the motion of the electric motor 134 to the sample vessel 118. When the clutch lever 150 is actuated, the clutch lever 150 transmits a first signal 270 to the controller 122 that communicates when the electric motor 134 is mechanically decoupled from the spring reel 151. Alternatively, if the electric motor 134 is re-engaged, the clutch lever 150 transmits a second signal 272 corresponding to the electric motor 134 being engaged with the spring reel 151. The first signal 270 further corresponds to a disengaged light 222 that signals the electric motor 134 is disengaged with the spring loaded reel, and the second signal 272 corresponds to an engaged light 220 that signals the electric motor 134 is engaged with the spring loaded reel.

Figure 9:
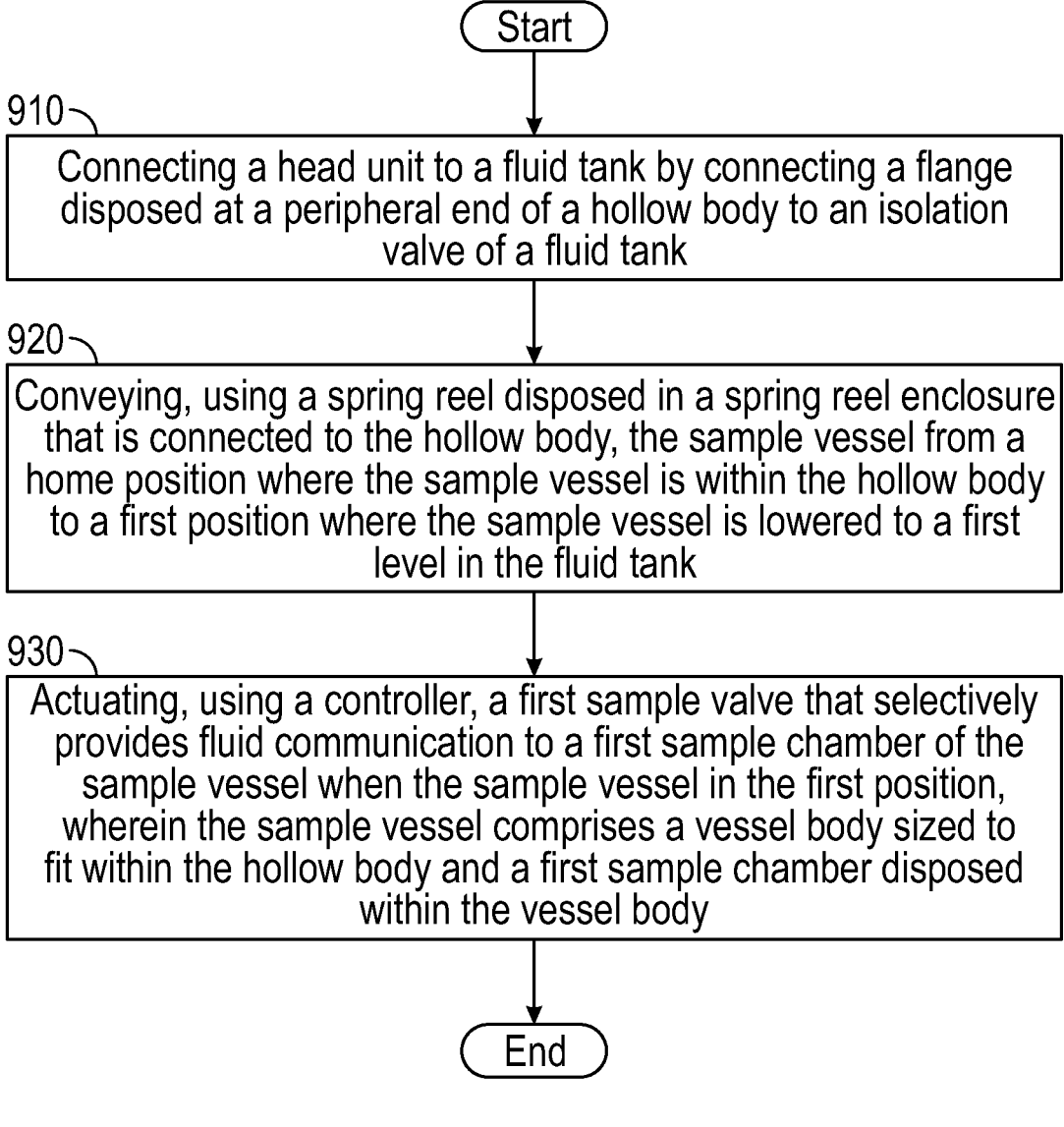
FIG. 9 depicts a flowchart in accordance with one or more embodiments

FIG. 9 depicts a method for sampling fluid in a fluid tank having an isolation valve. While the various flowchart blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 910, a head unit 104 is connected to a fluid tank 110 with an isolation valve 106. In this step, a lower flange 154 disposed at a peripheral end of a hollow body 102 is bolted or otherwise removably connected to an upper flange 108 of the main isolation valve 106 of the fluid tank 110. A sample vessel 118 is stored at a home position within the hollow body 102, and connecting the hollow body 102 to the fluid tank 110 orients the sample vessel 118 directly above the main isolation valve 106. The alignment of the main isolation valve 106 and the head unit 104 allows the sample vessel 118 to be lowered into the fluid tank 110 in step 920.

In step 920, the sample vessel 118 is conveyed from a home position in the hollow body 102 to a first position within the fluid tank 110. Specifically, an umbilical cable 124 attached to the sample vessel 118 is initially wound around a spring reel 151 disposed in the head unit 104 when the sample vessel 118 is in the home position. As the spring reel 151 is rotated, the umbilical cable 124 unwinds, which lowers the sample vessel 118 to a first position at a first level within the fluid tank 110. The first position corresponding to the first level may be any one of the upper position 112, the middle position 114, or the lower position 116, or any intermediary or alternative position within the fluid tank 110.

In step 930, a first sample valve of the sample vessel 118 is actuated to provide fluid communication between the fluid tank 110 and a first sample chamber of the sample vessel 118. Any of the sample valves 364-368 may be considered a first, second, or third sample valve, and any of the sample chambers 170-174 may be considered a first, second, or third sample chamber. The sample vessel 118 is formed of a vessel body 120, which is sized to fit within the hollow body 102 when the sample vessel 118 returns to the home position. The sample chambers 170-174 are formed by the vessel body 120 and a first plate 156, a second plate 158, and a third plate 160 as described above. After at least one of the sample chambers 170-174 has been filled with fluid sample(s), the spring reel 151 is reeled in, and the fluid sample(s) of the sample chambers 170-174 are collected by an operator through a sample collection port 130 of the hollow body 102.

Accordingly, the aforementioned embodiments as disclosed relate to a tank sample system useful for collecting one or more fluid samples within a fluid tank. Embodiments of a sample vessel according to the invention may be operated using low voltage DC power and pneumatic pressure, advantageously allowing the sample vessel to operate in explosive environments without concerns of ignition. Furthermore, the design of the sample vessel can be easily modified to include more or fewer sample chambers by changing the number of plates in the sample vessel and potentially the length of the sample vessel, while also varying the structure of a tandem diaphragm switch to accommodate the number of sample chambers. Finally, the sample vessel may be operated in an automatic, semi-manual, or manual collection mode according to an operator's discretion, allowing the sample vessel to be easily adapted to its environment.

Although only a few embodiments of the invention have been described in detail above, those skilled in the art will readily appreciate that many modifications are possible in the example embodiments without materially departing from this invention. For example, although the above methods describe an electromagnetic clutch, a mechanical clutch may be used interchangeably. Alternatively, the electric motor may be replaced with a gas motor. Additionally, the tandem diaphragm switch may be embodied as a pressure transducer that transmits electrical signals to the controller. Similar changes may be applied to each component of the sample vessel, where the components are replaced with electronic sensors and/or actuators. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A sample system for a fluid tank having an opening, comprising:
    a head unit comprising a hollow body, wherein an end of the hollow body comprises a head connection adapted to removably connect to the opening of the fluid tank;
    a sample vessel comprising: a vessel body sized to fit within the hollow body, a first sample chamber disposed within the vessel body, and a first sample valve that selectively actuates to provide fluid communication to the first sample chamber;
    a transport mechanism connected to the head unit and the sample vessel, the transport mechanism being configured to selectively move the sample vessel between a home position where the sample vessel is within the hollow body and a first position where the sample vessel is lowered to a first level in the fluid tank; and
    a controller configured to actuate the first sample valve when the sample vessel is in the first position.

2. The sample system of claim 1, further comprising a first flush valve that selectively provides fluid communication between the first sample chamber and the head unit when the sample vessel is in the home position.

3. The sample system of claim 2, further comprising a second flush valve that selectively provides fluid communication between a second sample chamber and the head unit when the sample vessel is in the home position.

4. The sample system of claim 3, wherein the second flush valve comprises a second pneumatic valve.

5. The sample system of claim 4, wherein the sample vessel further comprises a remote actuation mechanism configured to actuate at least one of the first flush valve and the second flush valve in response to a signal from the controller.

6. The sample system of claim 2, wherein the first flush valve comprises a first pneumatic valve.

7. The sample system of claim 1, wherein the sample vessel further comprises a second sample chamber disposed within the vessel body and a second sample valve that selectively provides fluid communication to the second sample chamber.

8. The sample system of claim 7, wherein the transport mechanism is further configured to selectively move the sample vessel to a second position at a second level in the fluid tank.

9. The sample system of claim 8, wherein the controller is further configured to actuate the second sample valve when the sample vessel is in the second position.

10. The sample system of claim 7, wherein the sample vessel further comprises a remote actuation mechanism configured to actuate at least one of the first sample valve and the second sample valve in response to a signal from the controller.

11. The sample system of claim 10, wherein the remote actuation mechanism comprises a switch and a manifold.

12. The sample system of claim 1, wherein the transport mechanism comprises a motor, and wherein the controller is further configured to control operation of the motor.

13. The sample system of claim 12, where in the transport mechanism further comprises a selectively engageable clutch.

14. The sample system of claim 1, wherein the head unit further comprises a display in communication with the controller.

15. The sample system of claim 14, wherein, upon instruction by a user via the display, the controller executes instructions causing:
    the transport mechanism to lower the sample vessel from the home position to the first position;
    the first sample valve to open at the first position, allowing fluid from the fluid tank to flow into the first sample chamber;
    the first sample valve to close after fluid is present in the first sample chamber;
    the transport mechanism to return the sample vessel to the home position; and
    a first flush valve to discharge fluid from the first sample chamber to the head unit.

16. A method for sampling fluid in a fluid tank having an opening, the method comprising:
    connecting a head unit to the fluid tank, wherein the head unit comprises a hollow body having an end comprising a head connection adapted to removably connect to the opening of the fluid tank;
    conveying, using a transport mechanism connecting the head unit to a sample vessel, the sample vessel from a home position where the sample vessel is within the hollow body to a first position where the sample vessel is lowered to a first level in the fluid tank; and
    actuating, using a controller, a first sample valve that selectively provides fluid communication to a first sample chamber of the sample vessel when the sample vessel is in the first position, wherein the sample vessel comprises a vessel body sized to fit within the hollow body and the first sample chamber is disposed within the vessel body.

17. The method of claim 16, further comprising selectively providing fluid communication to a second sample chamber using a second sample valve, wherein the second sample chamber is disposed within the vessel body of the sample vessel.

18. The method of claim 17, further comprising selectively moving the sample vessel to a second position at a second level in the fluid tank, using the transport mechanism.

19. The method of claim 18, further comprising actuating the second sample valve when the sample vessel is in the second position, using the controller.

20. The method of claim 19, further comprising actuating, using a remote actuation mechanism, at least one of the first sample valve and the second sample valve in response to a signal from the controller.

* * * * *